United States Patent
Smith et al.

(10) Patent No.: US 11,690,041 B2
(45) Date of Patent: Jun. 27, 2023

(54) WI-FI Z-AXIS POSITIONING

(71) Applicant: Apple Inc., Cupertino, CA (US)

(72) Inventors: Brian S. Smith, Cupertino, CA (US); Robert W. Mayor, Half Moon Bay, CA (US); Wei Kong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/163,159

(22) Filed: Jan. 29, 2021

(65) Prior Publication Data

US 2021/0400618 A1 Dec. 23, 2021

Related U.S. Application Data

(60) Provisional application No. 63/041,783, filed on Jun. 19, 2020.

(51) Int. Cl.
| | |
|---|---|
| *H04W 64/00* | (2009.01) |
| *H04W 4/02* | (2018.01) |
| *H04W 48/16* | (2009.01) |
| *H04W 84/12* | (2009.01) |
| *H04B 17/318* | (2015.01) |

(52) U.S. Cl.
CPC ........ *H04W 64/003* (2013.01); *H04B 17/318* (2015.01); *H04W 4/02* (2013.01); *H04W 48/16* (2013.01); *H04W 64/00* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2009/0123048 A1 | 5/2009 | Leroux et al. | |
| 2011/0018732 A1 | 1/2011 | Cho et al. | |
| 2012/0309410 A1* | 12/2012 | Marti | H04W 4/029 455/456.1 |
| 2013/0260771 A1* | 10/2013 | Wirola | H04W 16/18 455/446 |
| 2014/0345302 A1 | 11/2014 | Ziegler | |
| 2015/0170075 A1 | 6/2015 | Self et al. | |
| 2016/0037305 A1* | 2/2016 | Pan | H04W 4/02 455/456.1 |
| 2016/0106368 A1* | 4/2016 | Wu | G01P 13/00 702/50 |
| 2017/0280301 A1* | 9/2017 | Chang | H04W 4/33 |
| 2017/0310827 A1 | 10/2017 | Mehta et al. | |
| 2018/0275261 A1* | 9/2018 | Khan | G01S 5/02 |
| 2019/0047788 A1 | 2/2019 | Winkler | |
| 2019/0130724 A1 | 5/2019 | Harrod, IV et al. | |
| 2020/0249026 A1* | 8/2020 | Ivanov | G01C 5/06 |
| 2021/0055372 A1* | 2/2021 | Rauhala | H04W 4/029 |
| 2021/0400615 A1 | 12/2021 | Smith et al. | |

* cited by examiner

*Primary Examiner* — German Viana Di Prisco
(74) *Attorney, Agent, or Firm* — Aikin & Gallant, LLP

(57) ABSTRACT

Described herein are techniques to enable a mobile device to determine a Z-axis coordinate based on altitudes associated with Wi-Fi access points detected in a Wi-Fi scan by the mobile device. One embodiment provides for an electronic device configured to compute a weighted average of Z-axis coordinates associated with detected Wi-Fi access points and determine a Z-axis coordinate for the electronic device based on the weighted average.

20 Claims, 14 Drawing Sheets

WI-FI Z-AXIS POSITIONING

CROSS-REFERENCE

This application claims the benefit of priority of U.S. Provisional Application No. 63/041,783 filed Jun. 19, 2020 which is incorporated herein by reference.

FIELD

Embodiments described herein relate to a technique to enable simultaneous localization and mapping for Z-axis coordinates.

BACKGROUND

Some mobile devices have features for determining a geographic location. For example, a mobile device can include a receiver for receiving signals from a global navigation satellite system (GNSS), such as the Global Positioning System (GPS). The mobile device can determine a geographic location, including latitude and longitude, using the received GNSS signals. In many places where a mobile device does not have a line of sight with GNSS satellites, location determination can be error prone. For example, the accuracy of GNSS location determination may be low inside a building, tunnel, or in areas in which buildings can obstruct the line of sight to satellites. In scenarios in which a mobile device has line of sight with multiple satellites, the margin of error may be too large to determine, for example, on which floor of a building the mobile device is located.

SUMMARY

Described herein are techniques to enable a mobile device to determine a Z-axis coordinate based on altitudes associated with Wi-Fi access points detected in a Wi-Fi scan by the mobile device. One embodiment provides for an electronic device configured to compute a weighted average of Z-axis coordinates associated with detected Wi-Fi access points and determine a Z-axis coordinate for the electronic device based on the weighted average.

One embodiment provides for an electronic device comprising a wireless network interface, a memory coupled with the wireless network interface, and one or more processors to execute instructions stored in the memory. The instructions cause the one or more processors to scan for wireless network access points within range of the electronic device, determine received signal strength indicator for a set of wireless network access points detected during the scan, retrieve, from a server, a Z-axis coordinate for one or more wireless network access points, compute a set of weights for the one or more wireless access points based on a respective received signal strength indicator of the one or more wireless access points, compute a weighted average of the Z-axis coordinates, and determine a Z-axis coordinate for the electronic device based on the weighted average.

One embodiment provides a method comprising, on an electronic device including a wireless network interface and one or more memory devices coupled with the wireless network interface, scanning, via a wireless network interface of the electronic device, for wireless network access points within range of the electronic device, determining a received signal strength indicator for a set of wireless network access points detected during the scan, retrieving, from a server, a Z-axis coordinate for one or more wireless network access points in the set of wireless network access points, computing a set of weights for the one or more wireless access points based on a respective received signal strength indicator of the one or more wireless access points, computing a weighted average of the Z-axis coordinates based on the set of weights, and determining a Z-axis coordinate for the electronic device based on the weighted average.

One embodiment provides a non-transitory machine-readable medium storing instructions to cause one or more processors of an electronic device to perform operations comprising, scanning, via a wireless network interface of the electronic device, for wireless network access points within range of the electronic device, determining a received signal strength indicator for a set of wireless network access points detected during the scan, retrieving, from a server, a Z-axis coordinate for one or more wireless network access points in the set of wireless network access points, computing a set of weights for the one or more wireless access points based on a respective received signal strength indicator of the one or more wireless access points, computing a weighted average of the Z-axis coordinates based on the set of weights, and determining a Z-axis coordinate for the electronic device based on the weighted average.

Other features of the present embodiments will be apparent from the accompanying drawings and from the Detailed Description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1A:
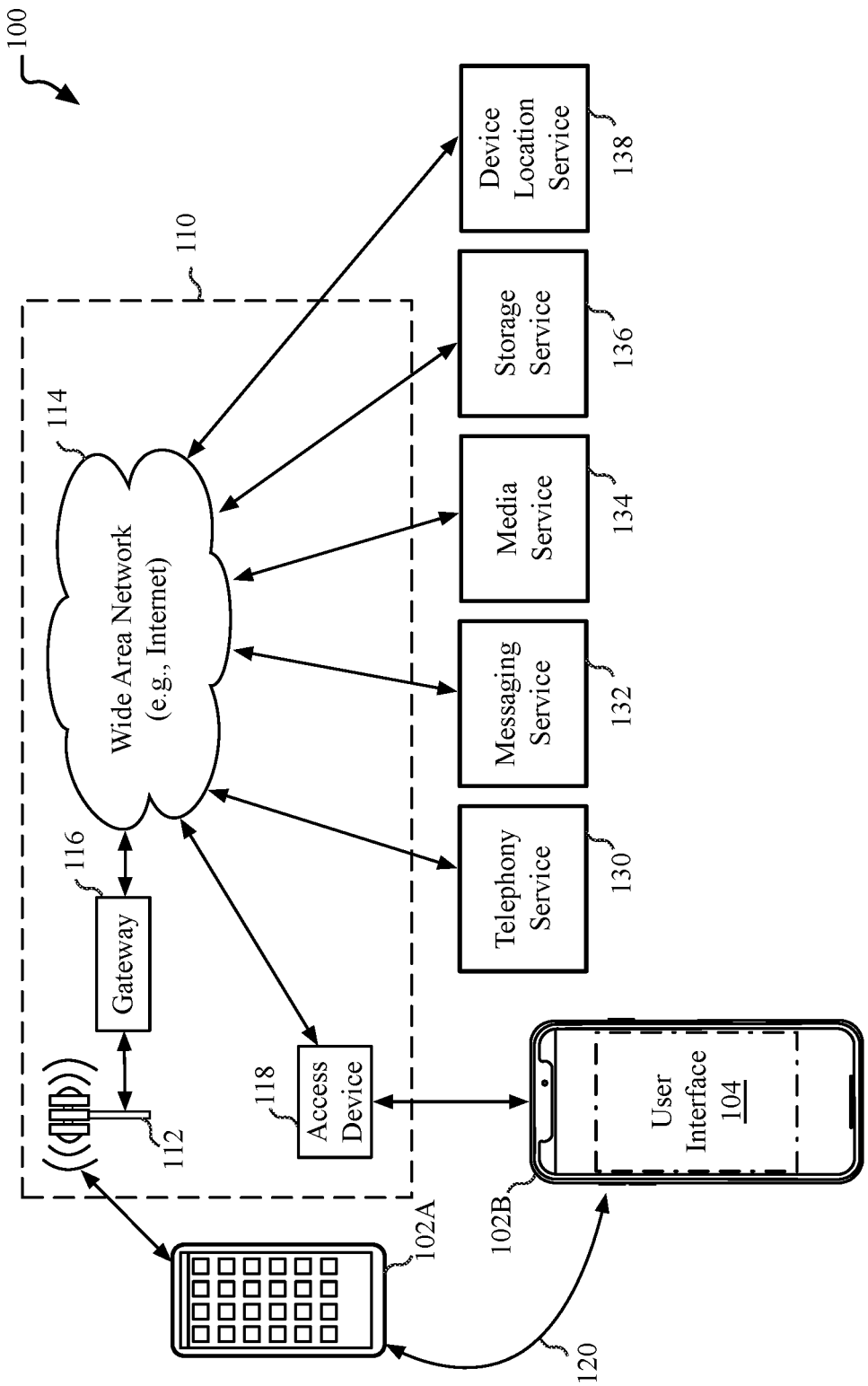
FIG. 1A illustrates a block diagram of a network operating environment for mobile devices.

Indoor positioning systems can use wireless local-area network (WLAN) (e.g., Wi-Fi) infrastructure to allow a mobile device to determine its position in an indoor venue, where other techniques such as GPS may not be able to provide accurate and/or precise position information. In some implementations, reference points are predetermined locations within the indoor venue for which positioning information is desired. A harvesting phase can be performed for each reference point. During the harvesting phase, a harvesting device can gather a plurality of measurements associated with access points (APs) that are visible during a Wi-Fi scan at the reference points. For example, the harvesting device can measure the received signal strength indicators (RSSIs) of each of the signals received from each of the APs. For each reference point, a plurality of RSSI measurements are obtained for each AP. The full set of measurements for all APs at all reference points within the venue can be stored in a database (e.g., a fingerprint database). The fingerprint database can be stored on a server that is accessible to mobile devices via a network.

The fingerprint database can store centroid data that includes an altitude that is determined for the AP based on harvested data. The APs can have an associated altitude that is determined via a variety of mechanisms, including barometric pressure readings gathered by a survey device. In one embodiment, the barometric pressure readings can be correlated with known data as to the vertical layout of an indoor venue. The mobile devices can perform Z-axis positioning by performing an AP scan and comparing the detected AP and RSSI data with the data in the fingerprint database. The mobile devices can use the comparison to determine a Z-axis position for the mobile device. In one embodiment, the Z-axis coordinate for the mobile device can be provided to emergency services during an emergency services call along with other encrypted data stored on the mobile device.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1A is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 132, a media service 134, a storage service 136, and a device location service 138 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 132 can, for example, provide e-mail and/or other messaging services. The media service 134 can, for example, provide access to media files, such as song files, audio books, movie files, video clips, and other media data. The storage service 136 can provide network storage capabilities to mobile device 102A and mobile device 102B to store documents and media files. The device location service 138 can enable a user to locate a lost or misplaced device that was, at least at some point, connected to the one or more wired and/or wireless networks 110. The device location service 138 can also be used to facilitate the determination of a device location to facilitate the provision of emergency services to the user of mobile device 102A-102B. Other services can also be provided, including a software update service to update operating system software or client software on the mobile device, as well as asset distribution services that can be used to distribute digital assets to the mobile devices 102A-102B. In one embodiment, the messaging service 132, media service 134, storage service 136, and device location service 138 can each be associated with a cloud service provider, where the various services are facilitated via a cloud services account associated with the mobile devices 102A-102B. In one embodiment the device location service 138 can also enable the mobile devices 102A-102B to determine a Z-axis coordinate (e.g., altitude, elevation) for the mobile devices 102A-102B using techniques described herein.

Figure 1B:
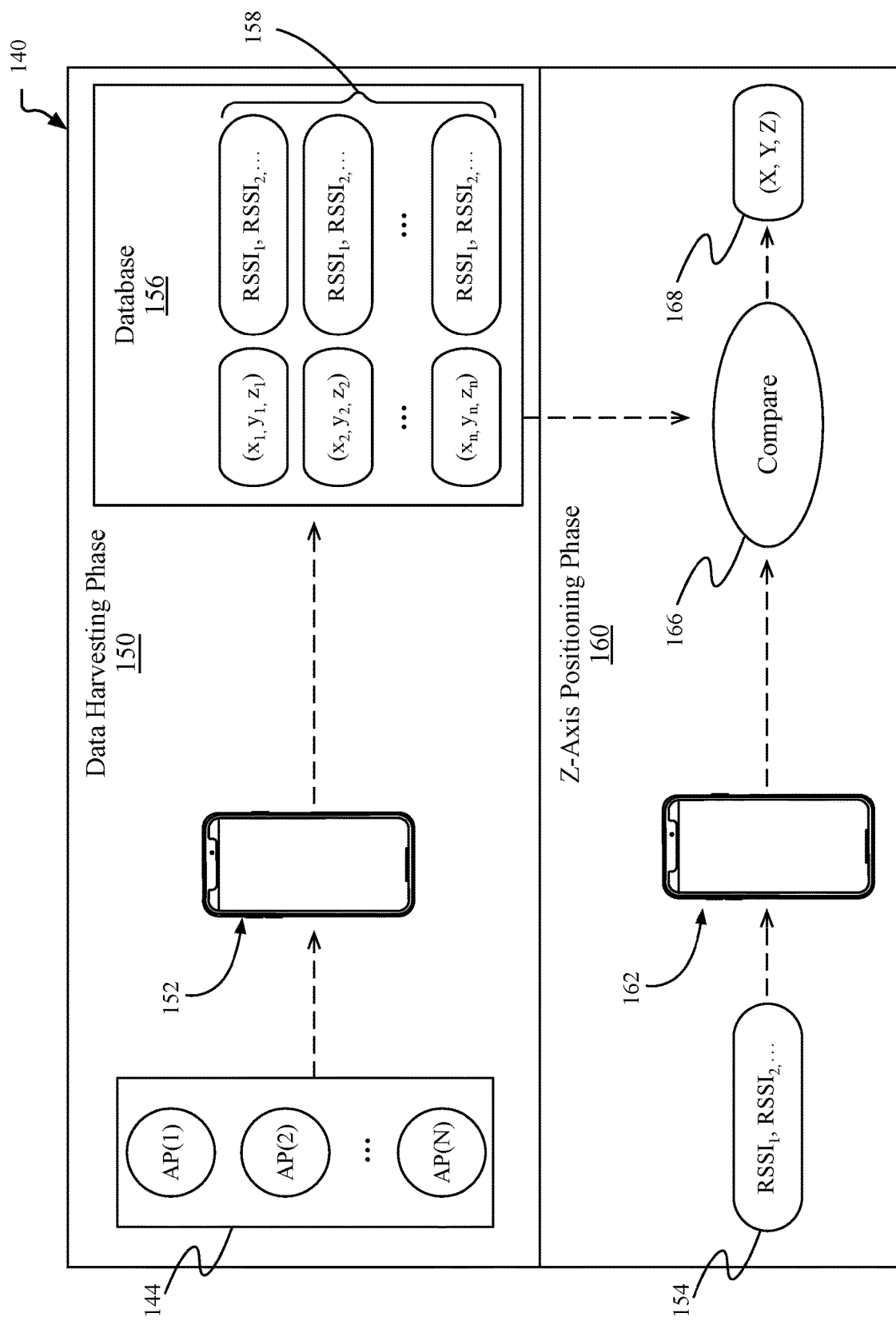
FIG. 1B illustrates a system enabled by the network operating environment to facilitate Z-axis positioning via Wi-Fi.

FIG. 1B illustrates a system enabled by the network operating environment 140 to facilitate Z-axis positioning via Wi-Fi. The network operating environment 140 enables the determination of a Z-axis position vis a data harvesting phase 150 and a positioning phase 160. During the data harvesting phase 150, a harvesting device 152 (e.g., a mobile computing device such as a smart phone, laptop, tablet computer, etc.) can perform Wi-Fi scans at various points throughout a multi-floor indoor venue and contribute location and scan data to a crowdsourced database 156. The position of a crowdsource data point location may be associated with an (x, y) coordinate which may, in some cases, correspond to latitude/longitude coordinates. The position may also be associated with a z coordinate, which can be an altitude or an elevation relative to a ground level altitude. The z coordinate may be determined via a variety of altitude determination mechanisms, such as a calibrated barometric pressure sensor.

The harvesting device 152 can perform a Wi-Fi scan to detect the presence of a plurality of access points (APs) 144. The APs 144 may be radio frequency (RF) signal transmitters that allow Wi-Fi compliant devices to connect to a network. At each reference point, the harvesting device 152 measure one or more characteristics of the wireless signals received from each AP 144. For example, the harvesting device 152 may be detect multiple access points (e.g., APs 144—AP(1), AP(2), AP(3), and AP(4)), each of which is associated with an identifier such as a media access control (MAC) address that the harvesting device 152 can use to identify the particular AP 144. The harvesting device 152 can measure characteristics of signals received from each AP 144, such as the received signal strength indicator (RSSI). The RSSI can be measured for multiple wireless signals received from each AP 144. The results are stored in a database 156, which may be referred to as a fingerprint database. The data stored in the database 156 may be referred to as harvest data 158. The database 156 may be stored on a server device.

A plurality of crowdsourced measurements may be obtained for each AP 144. For example, for each AP 144, a wireless signal may be received at set intervals (e.g., every second) and the RSSI may be measured for each wireless signal. The wireless signals may be received and the RSSI may be measured under different conditions. For example, hundreds of measurements may be gathered via crowdsourcing during a first period from a harvesting device 152 in a first orientation. Other measurements may be gathered from devices that are in different orientations. Measurements may be taken when the venue is occupied with a relatively large number of people, when the venue is largely empty, when the venue is completely empty, etc. Measurements may be taken when indoor obstructions, doors, etc. are in various open/closed states. Measurements may be taken under different climate conditions. The measurements may be taken under such a wide variety of circumstances to provide a relatively large data set for the particular reference point that is comprehensive and includes the variety of circumstances that may exist when a mobile device subsequently tries to determine its location in the positioning phase 160.

Once a sufficient number of crowdsourced measurements are aggregated for the first harvesting reference point that is located at $(x_1, y_1, z_1)$, an entry for the first reference point $(x_1, y_1, z_1)$ is stored as harvest data 158 in the database 156. The entry (e.g., sometimes referred to as an element of harvest data 158 or an entry of harvest data 158) includes the coordinates of the reference point and the various RSSI measurements for each of the APs 144. Data can also be gathered from a harvesting device 152 when the device is positioned at a second reference point $(x_2, y_2, z_2)$ and a similar process can be repeated to obtain an additional entry in the harvest data 158 for the second reference point $(x_2, y_2, z_2)$, which can likewise be stored in the database 156. The collection of entries of the harvest data 158 stored in the database 156 may be referred to as a "location fingerprint" of the venue.

The positioning phase 160 occurs after at least some of the location fingerprint of the venue (e.g., the harvest data 158 stored in the database 156) has been obtained. During the positioning phase 160, a mobile device 162 (which is typically different than the harvesting device 152) that is located at the venue may attempt to determine its location. In a similar fashion as that described above with respect to the data harvesting phase 150, the mobile device 162 receives wireless signals from one or more of the APs 144 positioned throughout the venue. The mobile device 162 can measure characteristics of the received wireless signals.

For example, the mobile device 162 may obtain RSSI measurements 154 of wireless signals received from each of the various APs 144. The mobile device 162 can use the obtained RSSI measurements 154 to compute a set of coordinates for the device. In one embodiment, to compute the set of coordinates, the RSSI measurements 154 are compared (166) to the location fingerprint (e.g., the harvest data) stored in the database 156. Based on the comparison, a location 168 of the mobile device 162 can be determined. The location 168 can include an X and Y coordinate that corresponds with a latitude and longitude of the location, as well as a Z coordinate associated with an altitude or elevation that is determined for the location. Multiple different techniques may be used for comparing the location fingerprint stored in the database 156 to the RSSI measurements 154. In some implementations, a probabilistic approach is used. The location fingerprint (e.g., the plurality of data included in the various harvested data entries) can be used to create RSSI probability distributions of all APs 144 at all reference points. The mobile device 162 can then determine the location 168 by selecting the highest probable location from a set of possible locations.

Figure 2A:
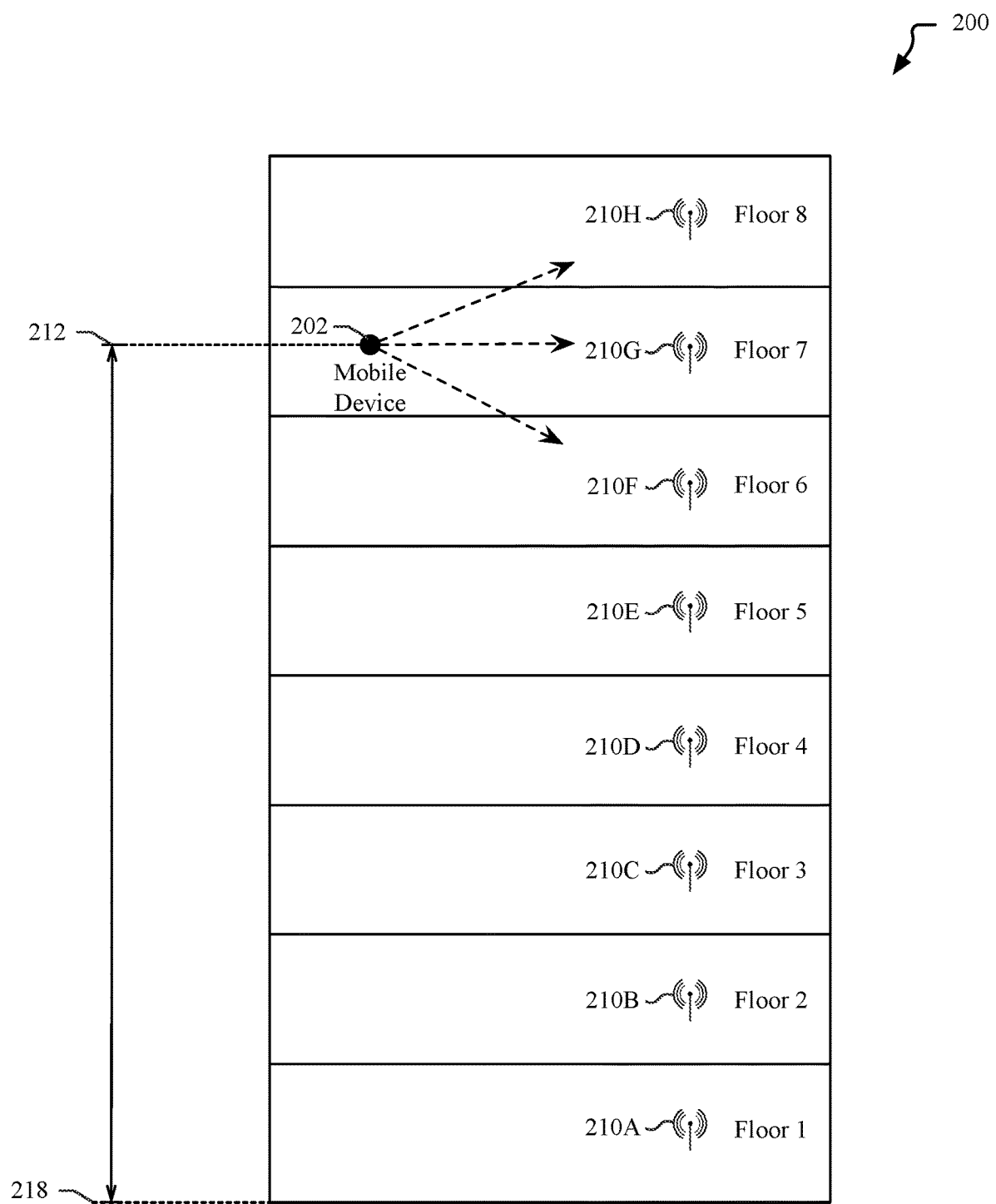
FIG. 2A-2C illustrate Z-axis positioning within a multi-floor indoor structure via Wi-Fi access point data.
Figure 2B:
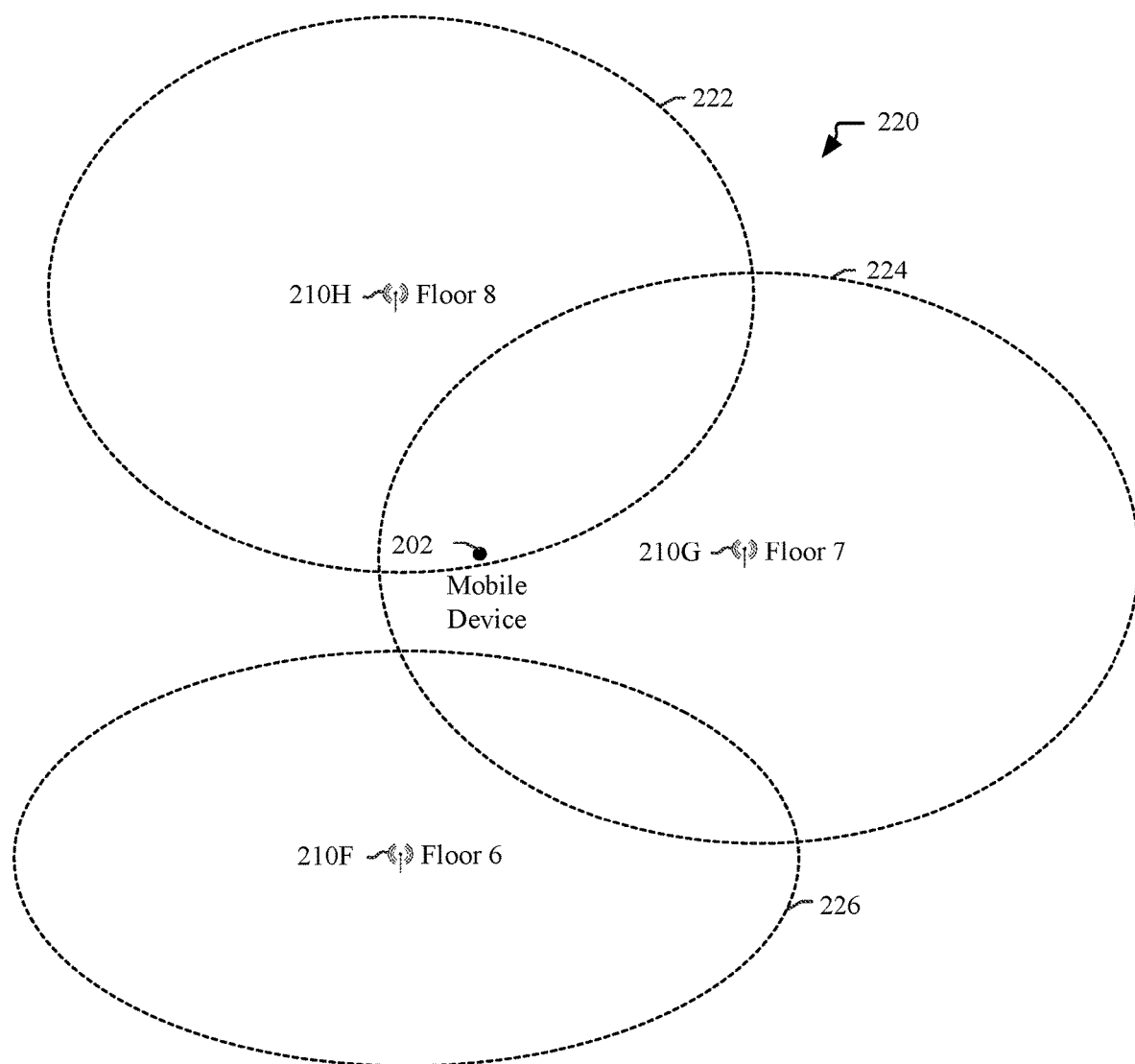
Figure 2C:
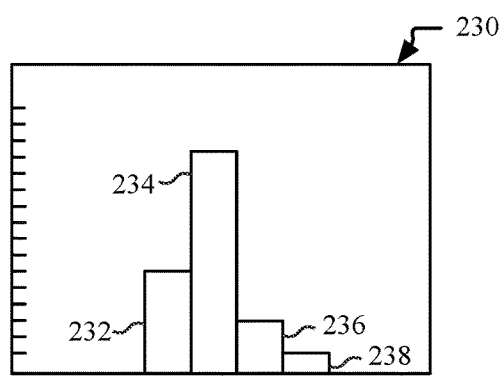

FIG. 2A-2C illustrate Z-axis positioning within a multi-floor indoor structure via Wi-Fi access point data. FIG. 2A illustrates a system 200 including wireless access points that can be used to facilitate Z-axis positioning for a mobile device 202. FIG. 2B illustrate a Z-axis positioning system 220 for the mobile device 202 based on access point centroids retrieved from a radio map server. FIG. 2C illustrates a histogram 230 that may be generated to determine a most probable altitude, elevation, or floor for a mobile device 202.

As shown in FIG. 2A, system 200 can be implemented within a multi-floor indoor venue in which one or more wireless access points 210A-210H are positioned on each of the multiple floors of the venue. While one access point is illustrated per-floor, depending on the configuration of the network, a single floor may have multiple access points, or a single access point may cover multiple floors. The wireless access points 210A-210H may be associated with a single network or multiple networks, such that the same or different service set identifiers (SSID) may be associated with the various wireless access points 210A-210H. The system 200 can be interacted with by the mobile device 202. The mobile device 202 may be similar to mobile devices 102A-102B of FIG. 1A (generally, mobile device 102) or mobile device 162 of FIG. 1B. The mobile device 202 can use the system 200 to determine a Z-axis coordinate 212. The Z-axis coordinate 212, depending on the configuration of the system may be an absolute altitude, a floor of the venue, or an elevation relative to a ground level altitude 218. The mobile device 202 can determine the Z-axis coordinate 212 based on the subset of the set of wireless access points 210A-210H that are detected in a Wi-Fi scan performed by the mobile device 202 in comparison to a radio map for the indoor venue. The radio map for the indoor venue may be retrieved from a radio map server that is accessible to the mobile device 202.

As shown in FIG. 2B, the mobile device 202 can use the illustrated Z-axis positioning system 220 to determine a Z-axis coordinate based on a Wi-Fi scan and access point centroids retrieved from a radio map server. In one example, the mobile device 202 can perform a Wi-Fi scan and detect a wireless access point 210F on floor 6 of the venue, a wireless access point 210G on floor 7 of the venue, and a wireless access point 210H on floor 8 of the venue. The mobile device 202 can retrieve a radio map for the venue that lists all wireless access points 210A-210H for the venue and centroids associated with the access points. Alternatively, the mobile device 202 may request the specific centroid data for only the detected Wi-Fi access points (e.g., Wi-Fi access points 210F-210H).

As illustrated, wireless access point 210F can be associated with centroid 226. Wi-Fi access point 210G can be associated with centroid 224. Wireless access point 210H can be associated with centroid 222. In one embodiment the centroid for a Wi-Fi access point is a data structure that includes a location coordinate field that lists 3D coordinates (e.g., X, Y, Z) for the Wi-Fi access point and/or a radio map that specifies expected RSSI values for the access point at various locations near the Wi-Fi access point. The radio map can be a set of coordinates and RSSI values generated based on the harvest data 158 in the database 156 of FIG. 1B that enables the mobile device 202 to determine its location based on detected access points and associated RSSIs. In some embodiments, the coordinates and RSSI values may be used to calculate a formula that enables an altitude estimate to be determined based on RSSI values of detected Wi-Fi access points. The calculated formula can be based on actual measurements, rather than generalized translation between RSSI and distance. The mobile device 202 can generate an altitude estimate based on the formula calculated from the centroid or by interpolating between reference points of the radio map. A weighted average of the altitudes associated with each Wi-Fi access point can then be calculated to estimate Z-axis coordinate for the mobile device.

As shown in FIG. 2B, the centroids 222, 224, 226 associated with wireless access points 210H, 210G, and 210F may not be explicitly spherical about the access point. The centroids can reflect signal attenuation that may occur as the radio signal passes through floors and ceilings of the venue. Accordingly, the measured received signal strength from an access point that is measured at a first reference point that is on the same floor as the access point may be stronger than at a second reference point that is the same radial distance from the access point but on a different floor.

As shown in FIG. 2C, the mobile device 202 can generate a histogram 230 to determine the most probable altitude, elevation, or floor for the mobile device 202. In one embodiment, a set of potential Z-axis coordinates 232, 234, 236, 238 can be determined based on the Z-axis coordinate associated with each detected Wi-Fi access point. A weighted average can be determined for the Z-axis coordinate by weighting each altitude according to the RSSI detected for the access point, with a stronger RSSI corresponding to a stronger weight. In one embodiment, Z-axis coordinates that differ significantly from an average or mean value such as coordinate 238 and, depending on algorithm tuning, coordinate 236, may be discarded before the weighted average value is computed.

Figure 3A:
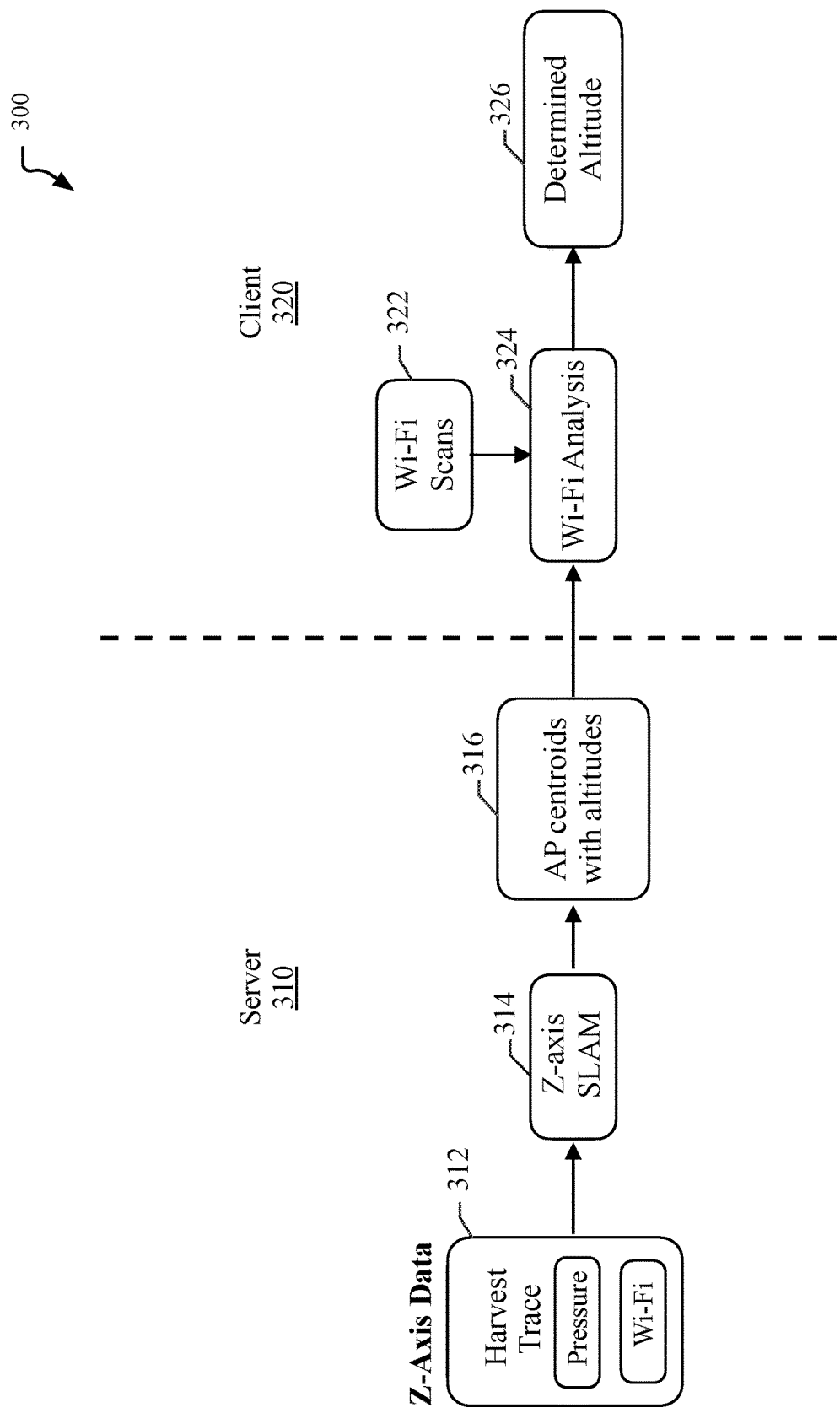
FIG. 3A-3B illustrate systems to enable Z-axis positioning within a multi-floor indoor structure via Wi-Fi access point data.
Figure 3B:
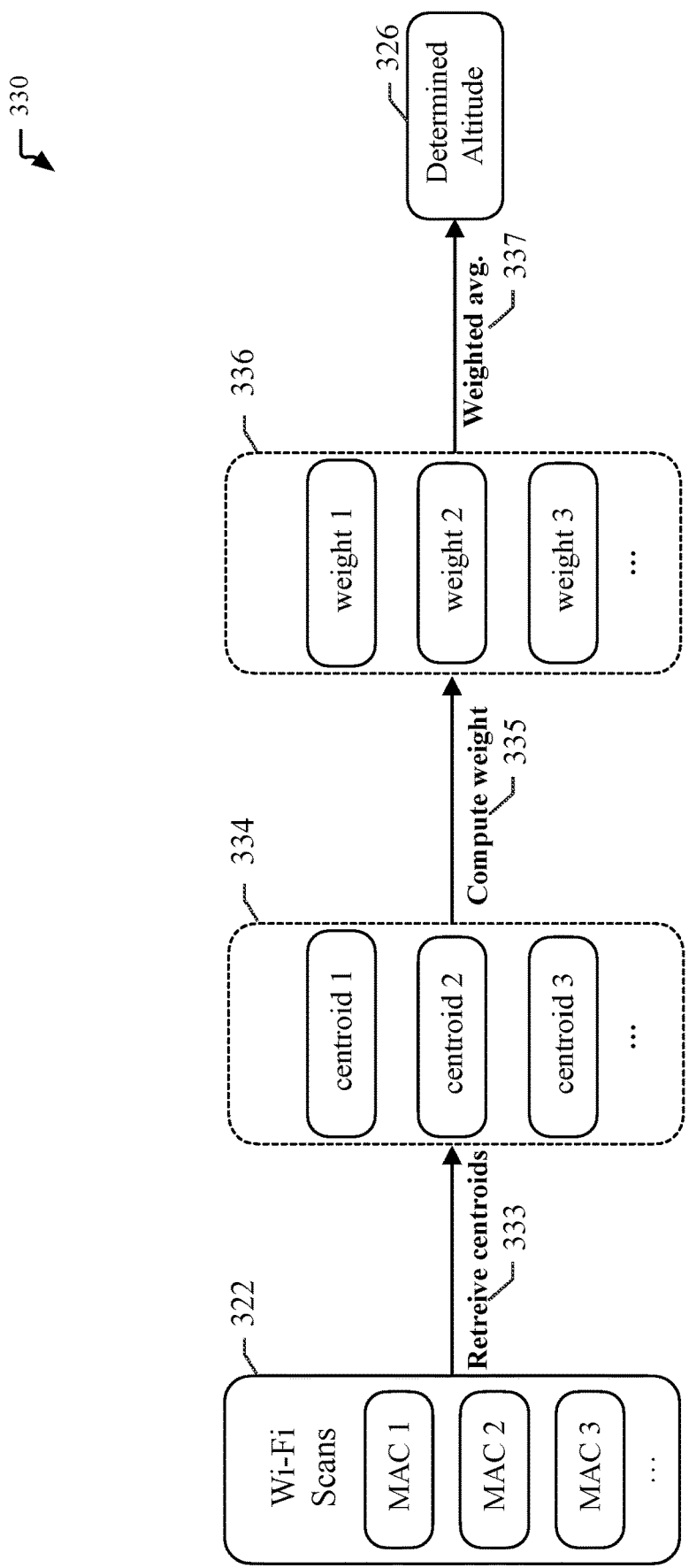

FIG. 3A-3B illustrate systems to enable Z-axis positioning within a multi-floor indoor structure via Wi-Fi access point data. FIG. 3A illustrates a system 300 in which a server 310 can provide access point centroids with altitudes 316 to a client 320. FIG. 3B illustrates a system 330 on a client 320 to determine an altitude based on Wi-Fi scans using the altitudes within the access point centroids.

As shown in FIG. 3A, system 300 includes a server 310 and a client 320. The server 310 may be one or more networked server device. The server 310 may be associated with the device location service 138 as in FIG. 1A. The server 310 may be associated with a cloud service system that includes multiple server devices at multiple datacenters that are configured to service a large number of clients 320. The client 320 can be an electronic device as described herein, such as mobile device 102 of FIG. 2A, mobile device 162 of FIG. 2B, or mobile device 202 of FIG. 2A-2B.

The server 310 can store a collection of data that may be used by the client 320 to determine a position of the client 320. Such data may be referred to as "trace" data, or generally as a "trace." A collection of position data obtained by enlisting a relatively large number of people may be referred to as harvest trace data, or generally, harvest traces. Each element of harvest data can be a sample point (e.g., a location where data is sampled) including sensor measurements obtained by the device. In one embodiment, the server can store harvest trace data 312 that includes a collection of sample points that include a barometric pressure value and a set of Wi-Fi metrics. The barometric pressure value can be correlated with an altitude estimate. The Wi-Fi metrics can include, for example, RSSIs for access points detected at a sample location. The harvest trace data 312 may be used by the server 310 to perform a Z-axis simultaneous location and mapping (SLAM) operation 314. The Z-axis SLAM operation 314 can be used to generate a dataset of access point centroids with altitudes 316.

In one embodiment the harvest trace data 312 can be broken down into multiple single floor traces (also referred to as "floor nodes") based on the detected floor transitions, where each floor trace is considered a floor node. Barometric pressure data can be used to determine the delta distance between floor nodes. The delta distance (e.g., in meters) can be converted into a floor ordinal (e.g., an integer value) by comparing the delta distance to a distance threshold (e.g., 3 meters) to determine the number of floor transitions between floor nodes. Accordingly, in such embodiment the harvest trace data 312 may be used by the Z-axis SLAM operation 314 to determine a floor estimate associated with a Z-axis coordinate for a Wi-Fi access point. The floor estimate and/or altitude can be stored as a field within the access point centroids with altitudes 316 that are made available to the client 320.

The client 320 can retrieve the access point centroids with altitudes 316 from the server and perform a Wi-Fi analysis operation 324 based on Wi-Fi scans 322 performed by the client 320. The Wi-Fi analysis operation 324 can enable the determination of an altitude 326 for the client 320.

As shown in FIG. 3B, the system 330 on a client 320 can be used to determine an altitude based on Wi-Fi scans using the altitudes within the access point centroids. In one embodiment the Wi-Fi scans 322 can be used to gather MAC addresses (e.g., MAC 1, MAC 2, MAC 3) for Wi-Fi access points that are detectable by the client 320. The client 320 can then use those MAC addresses to retrieve centroids (333) from the server 310. A set of retrieved centroids 334, in one embodiment, includes a centroid (e.g., centroid 1, centroid 2, centroid 3) associated with each detected MAC address. The centroids can be a data structure that includes an altitude and/or floor ordinal for access points having MAC addresses detected by the Wi-Fi scans 322. Wi-Fi metrics (e.g., RSSIs) associated with each detected MAC address can be used to compute a weight (335) for each centroid in the set of retrieved centroids 334. The computed weights 336 (e.g., weight 1, weight 2, weight 3) can be computed based on, for example, the RSSI associated with the MAC address for which a centroid is associated. A weighted average operation (337) can then be used to compute the determined altitude 326.

Figure 4A:
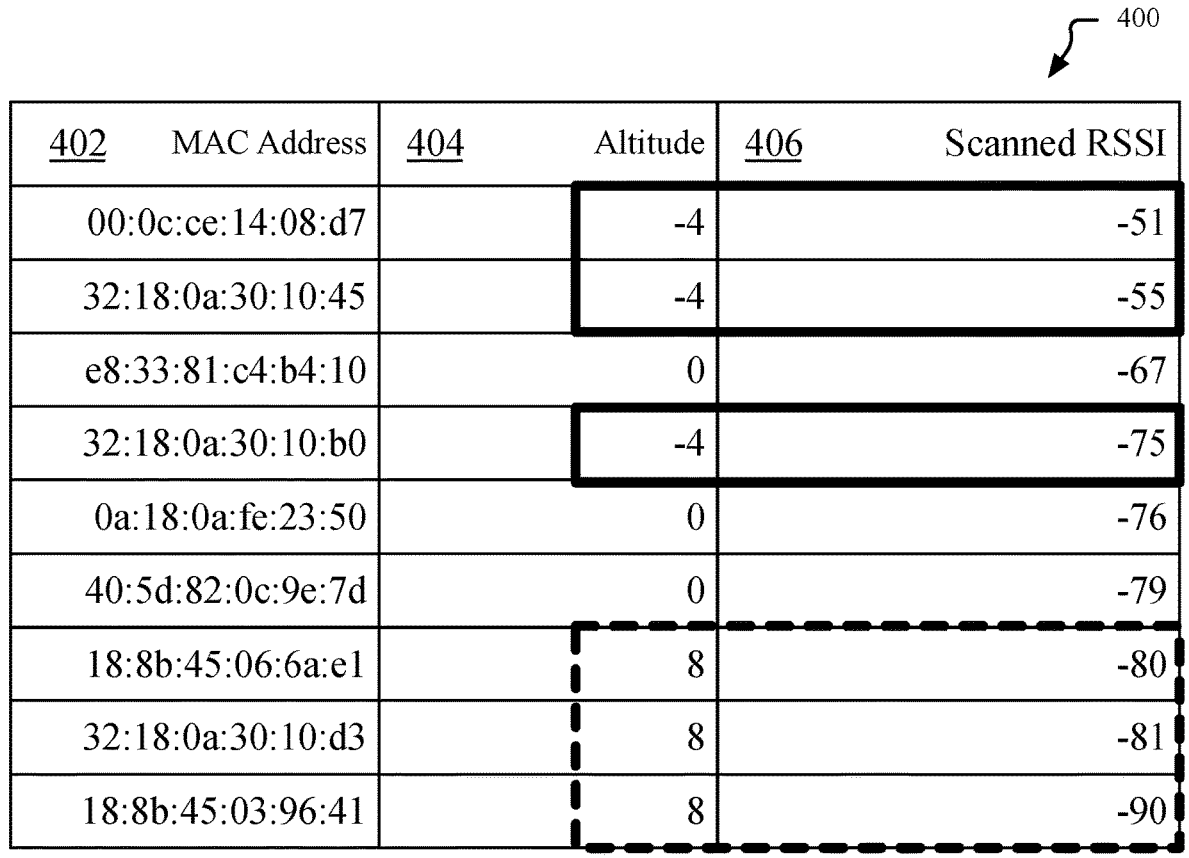
FIG. 4A-4B illustrate a Wi-Fi scan and associated cumulative centroid weighting.
Figure 4B:
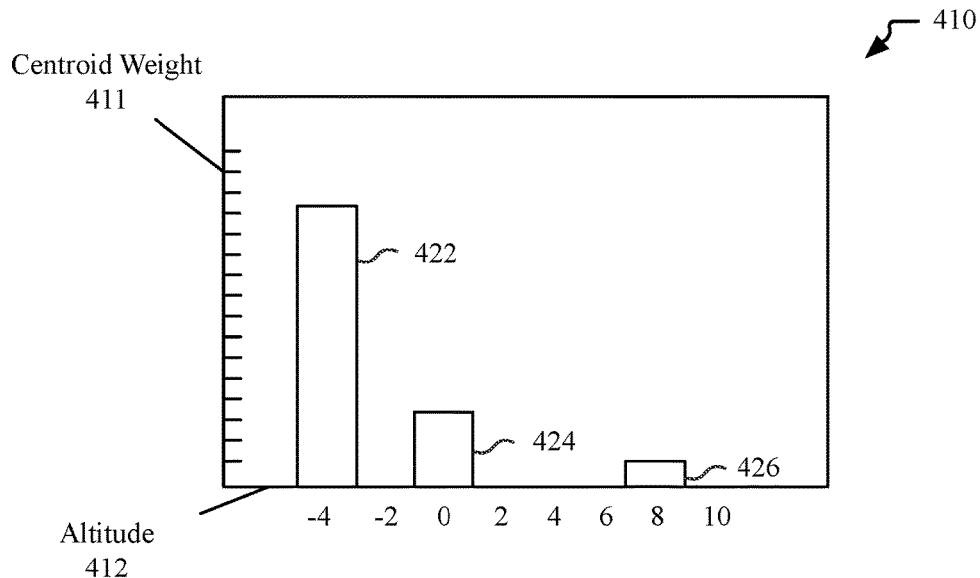

FIG. 4A-4B illustrate a Wi-Fi scan and associated cumulative centroid weighting, according to an embodiment. FIG. 4A illustrates a Wi-Fi scan data structure 400 that includes multiple MAC addresses with associated altitudes and RSSI values. FIG. 4B illustrates a histogram 410 of cumulative weights of centroids for the set of possible altitudes for a location of a client device.

As shown in FIG. 4A, a Wi-Fi scan performed by a client device can generate a data structure 400 performed by a client includes fields for a MAC address 402, altitude 404, and scanned RSSI 406. The altitude 404 may be represented in meters. The scanned RSSI 406 may be represented as decibel-milliwatts (dBm). In one embodiment the altitude 404 may be represented as a floor ordinal.

The MAC address 402 for an access point can be used to retrieve an altitude 404 from a centroid data structure. The scanned RSSI 406 can then be used to determine a weight to use for the altitude when calculating a cumulative weighted average altitude for the set of detected access points. In one implementation, an RSSI in the range of −30 dBm to −60 dBm is considered a very strong signal, with −61 dBm to −67 dBm being a strong signal. −70 dBm is the minimum signal strength for reliable packet delivery. −80 dBm is the minimum signal strength for basic service. Signals approaching −90 dBm are approaching the noise floor and may be considered very weak. The illustrated data structure 400 includes MAC addresses having altitudes of −4 meters, 0 meters, and 8 meters. Exemplary calculated cumulative weights for a given altitude are shown by the histogram 410 of FIG. 4B.

As shown in FIG. 4B the weighting algorithm for a centroid can be non-linear, such that the weighting algorithm is configured to heavily favor strong signals and de-emphasis weaker signals. The histogram 410 of FIG. 4B can have a centroid weight axis 411 and an altitude axis 412. A cumulative weight can be determined for each possible altitude, with the weight values for each centroid having that altitude value being summed. Strong RSSIs contribute significantly to the cumulative weight for an altitude, while weaker signals contribute relatively little. A weighted average of the altitudes can then be determined, with the weight of each altitude being determined by the cumulative centroid weight value associated with that altitude. For example, cumulative weight 422 can be associated with an altitude of −4 meters, cumulative weight 424 can be associated with an altitude of 0 meters, and cumulative weight 426 can be associated with an altitude of 8 meters. A weighted average can then be calculated to determine an altitude for the mobile device that performed the Wi-Fi scan. In one embodiment, altitudes having very low weights relative to other altitudes, or having a value that differ significantly from other potential altitudes, may be discarded as noise.

For example, the access points in the data structure that indicate 8 meters may be excluded from the weighted average. In one embodiment, those access points may be excluded due to the very low RSSIs associated with those access points. In one embodiment those access points may be excluded because the altitude of 8 meters differs significantly from the other potential altitude values of −4 meters and 0 meters. In one embodiment, a weighted average of potential altitudes may be calculated, and any altitudes that differ from the weighted average by more than a threshold value may be discarded as noise. Such embodiment is described in method 500 of FIG. 5A.

Figure 5A:
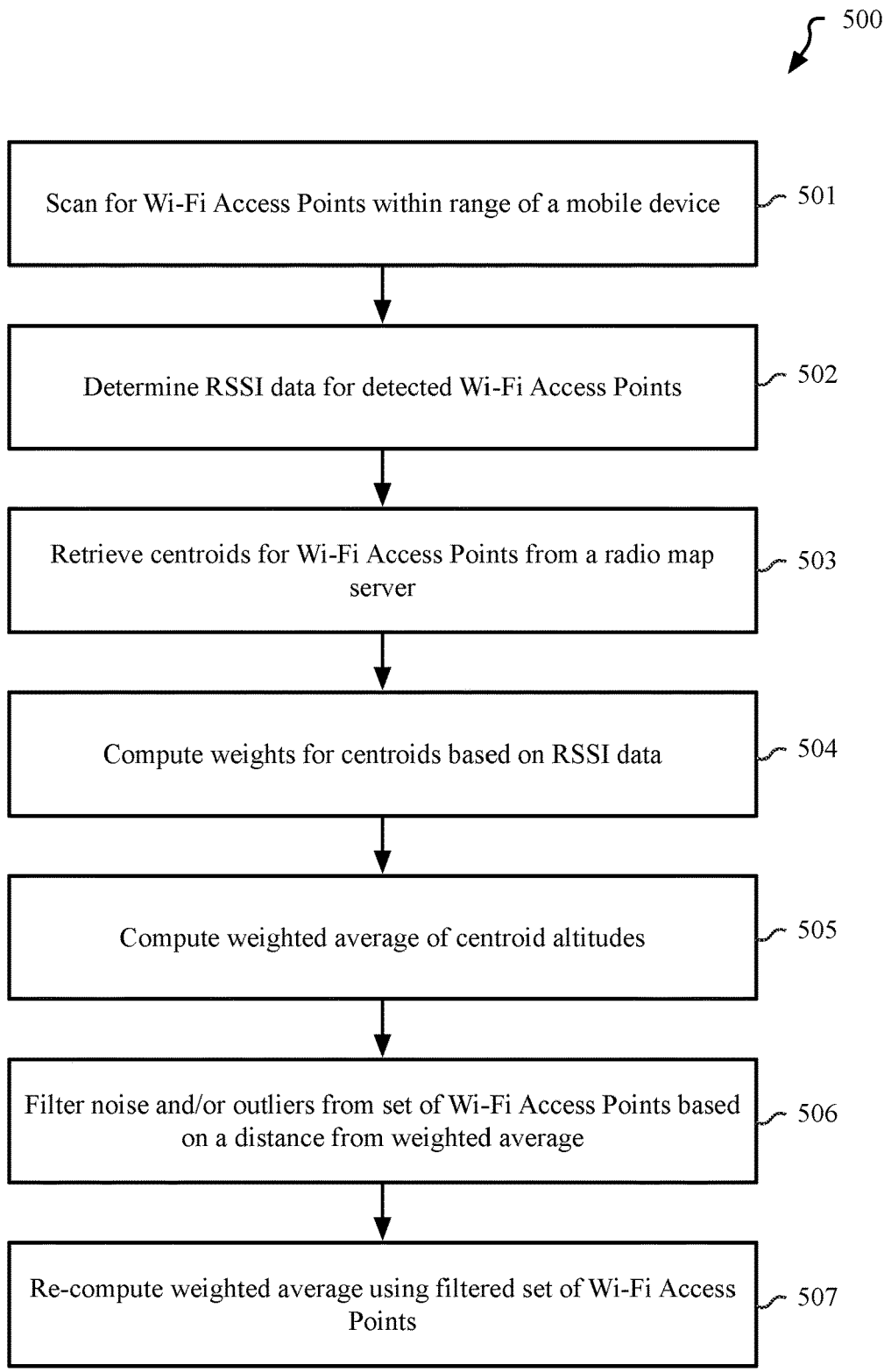
FIG. 5A-5B illustrate methods of determining an altitude based on detected Wi-Fi access points.
Figure 5B:
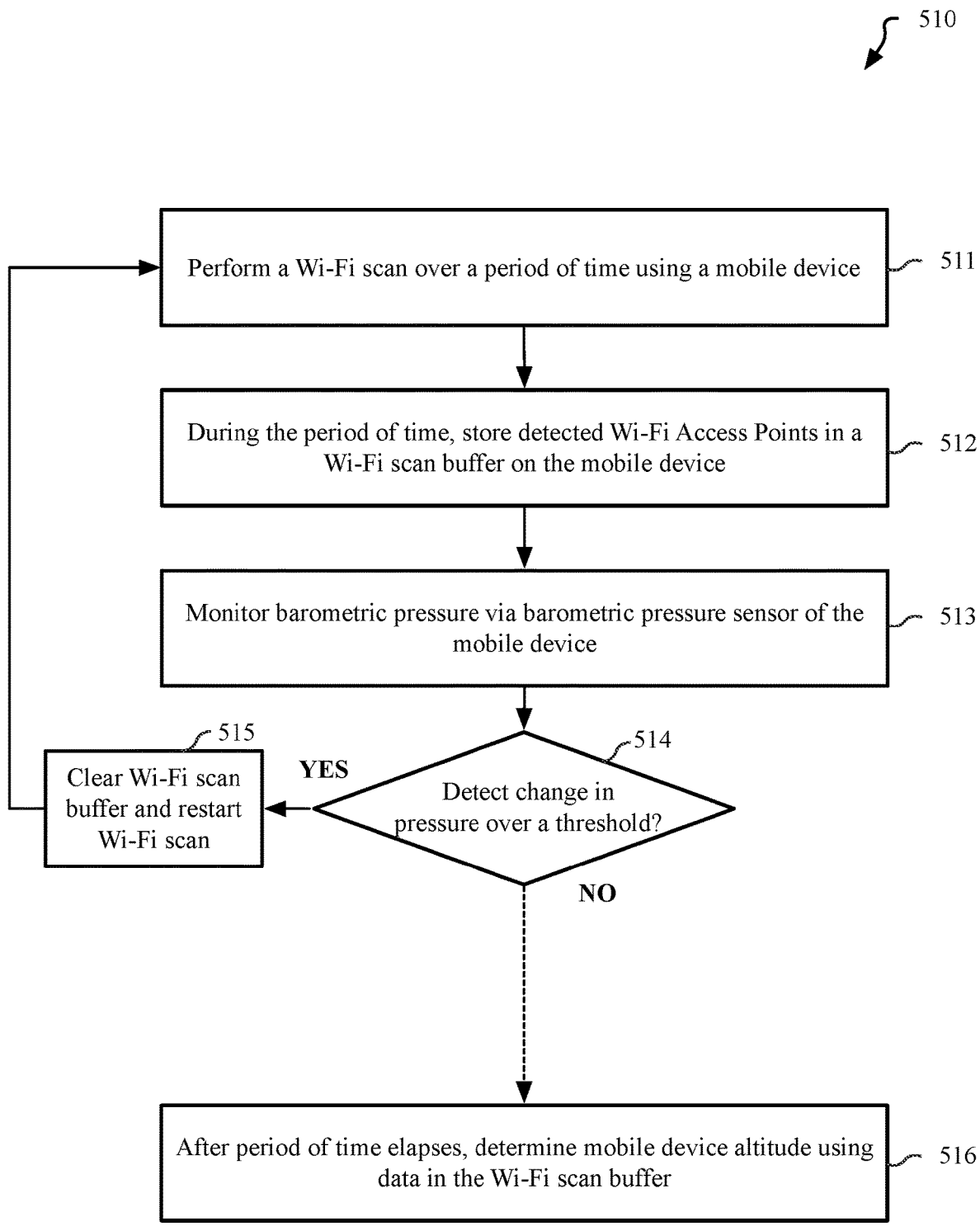

FIG. 5A-5B illustrate methods of determining an altitude based on detected Wi-Fi access points. FIG. 5A illustrates a method 500 of computing a weighted average of centroid altitudes or floor ordinals. FIG. 5B illustrates a method 510 of buffering Wi-Fi scan data to increase the accuracy of a Z-axis coordinate determination. Method 500 and method 510 can be performed by a mobile electronic device as described herein. Method 500 may be a method of implementing the Z-axis positioning phase 160 as in FIG. 1B.

As shown in FIG. 5A, a mobile device can scan for Wi-Fi access points within range of the mobile device (501). The mobile device can then determine RSSI data for detected Wi-Fi access points (502). The mobile device can then retrieve centroids for Wi-Fi access points from a radio map server (503). The radio map server can be, for example, server 310 as in FIG. 3A, and may be associated with a device location service 138 as in FIG. 1A. The radio map server can include a database 156 as in FIG. 1B that includes harvest data 158 that is generated based on a crowdsourced data harvesting phase 150. The mobile device, using the centroids retrieved from the radio map server, can then compute weights for the centroids based on RSSI data (504). The weights can be computed to heavily favor stronger RSSI signals and de-emphasize weak RSSI signals.

As an optimization to reduce the impact of noise and outliers in the data, the mobile device can compute a weighted average of centroid altitudes (505) and then filter (e.g., remove) noise and/or outliers from set of Wi-Fi access points based on a distance from weighted average (506). For example, Wi-Fi access points having centroid altitudes that are greater than a threshold value from the computed weighted average may be discarded from the set of Wi-Fi access points that are used to compute the Z-axis coordinate. The mobile device can then re-compute the weighted average using the filtered set of Wi-Fi access points (507). For method 500, where an altitude is referenced, the altitude may be substituted for a floor ordinal that specifies a floor or level of the building in which the Wi-Fi access point is located.

As shown in FIG. 5B, a method 510 of buffering Wi-Fi scan data can be implemented by a mobile device that results in an increase in the accuracy of the Z-axis coordinate determination. Method 510 includes for the mobile device to perform a Wi-Fi scan over a period of time (511). The period of time may be, for example, thirty seconds, although other scan periods may be used. In one embodiment, the Wi-Fi scan may continue for an extended period of time until at least a minimum number of Wi-Fi access points are detected. During the period of time, the mobile device can store detected Wi-Fi Access Points in a Wi-Fi scan buffer on the mobile device (512). The mobile device can also monitor the barometric pressure at the location of the mobile device via a barometric pressure sensor of the mobile device (513). If the mobile device, via the barometric pressure sensor, detects a change in pressure over a threshold ("yes," 514), the mobile device can clear the Wi-Fi scan buffer and restart the Wi-Fi scan (515). The mobile device may then perform a new Wi-Fi scan to detect additional Wi-Fi access points (511). The Wi-Fi scan buffer may be cleared and the Wi-Fi scan restarted in response to pressure change over a threshold because the pressure change may indicate that the mobile device has, for example taken an elevator or escalator to a different floor of the venue and previously stored Wi-Fi access point data may no-longer be relevant for altitude or floor determination. If a pressure change exceeding the threshold is not detected ("no", 514), and after the period of time elapses, the mobile device can determine an altitude using the data in the Wi-Fi scan buffer (516), for example, using method 500 of FIG. 5A.

Using Device Determined Altitude for Emergency Service Calls

In one embodiment, the altitude that is determined using the techniques described above can be used to determine a location for a user when the user uses the mobile device to contact emergency services during an emergency situation. The altitude or floor of the mobile device can be provided in addition to other information stored on the mobile device, such as health data gathered by the mobile device or a wearable device that is associated with the mobile device.

Figure 6:
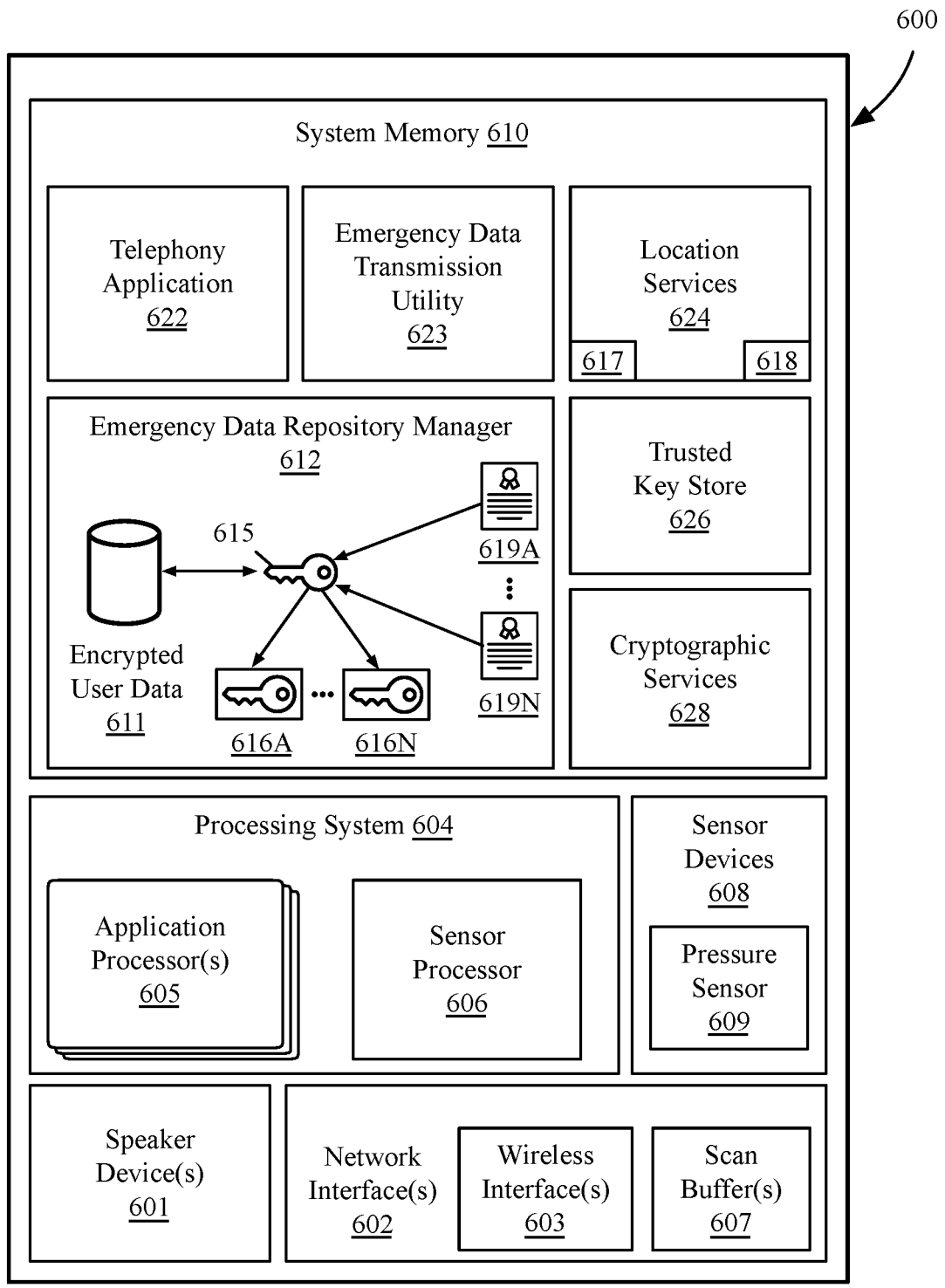
FIG. 6 illustrates a client system architecture to enable the secure provision of location and altitude data to an emergency service provider.

FIG. 6 illustrates a client system architecture 600 to enable the secure provision of location and altitude data to an emergency service provider. The mobile device 102 can include one or more speaker devices 601 to enable playback of the audio portion of media, alarms, alerts, notifications, or telephone calls played on or performed by the mobile device 102. The mobile device 102 also includes one or more network interface(s) 602, which can include one or more wireless interface(s) 603 to enable wireless network connectivity. The one or more wireless interface(s) 603 can couple with baseband processing logic that provides support for wireless networking protocols such as, but not limited to Bluetooth, Wi-Fi, near field communication (NFC), other wireless networking technologies. In some implementations, the network interface(s) 602 may also support a wired network connection. In one embodiment, the network interface(s) 602 and/or memory accessible by processing logic of the network interface(s) 602 can store one or more scan buffer(s) 607 that buffer scan data that is gathered via the one or more wireless interface(s) 603 (e.g., Bluetooth scans, Wi-Fi scans, etc.). The scan buffer(s) 607 can store scan data until the scan data can be copied to system memory 610 for further processing.

The computing device also includes a processing system 604 having multiple processor devices. In one embodiment the processing system 604 includes one or more application processor(s) 605 to execute instructions for user and system applications that execute on the computing device. The processing system can also include a sensor processor to process and monitor a suite of sensor devices 608 having sensors including, but not limited to motion sensors, light sensors, proximity sensors, biometric sensors, audio sensors (e.g., microphones), and image sensors (e.g., cameras). The sensor devices 608 can also include a pressure sensor 609, such as a barometric pressure sensor as described herein. The sensor processor 606 can enable low-power monitoring of always-on sensors within the suite of sensor devices 608. The sensor processor 606 can allow the application processor(s) 605 to remain in a low power state when the mobile device 102 is not in active use while allowing the mobile device 102 to remain accessible via voice or gesture input to a virtual assistant or to incoming network data received via the network interface(s) 602.

In one embodiment the mobile device 102 includes a system memory 610 which can be a system virtual memory having an address space that includes volatile and non-volatile memory. The system memory 610 can include a telephony application 622, an emergency data transmission utility 623, and location services logic 624. The telephony application 622 enables the mobile device 102 to contact an emergency service provider, for example, via the telephony service 130 of FIG. 1A. The emergency data transmission utility 623 facilitates the transmission of emergency data from the mobile device 102, such as but not limited to an encrypted data repository including location and/or health data. The location services logic 624 provides a locations services subsystem that enables software logic to query current and historical location data for the mobile device 102. The location services logic 624 can be associated with an operating system of the mobile device 102. The location services logic 624 enables operating system and application logic to request a location of the mobile device 102. The location of the mobile device 102 can be determined via a GNSS system or a wireless positioning system, such as a Wi-Fi positioning system or a wireless positioning system based on cellular or mobile/data base stations. In one embodiment the location services logic 624 includes altitude determination logic 618 that can retrieve a radio map 617 from a radio map server and process scan data stored in one or more scan buffer(s) 607 to determine an altitude for the mobile device 102.

The system memory 610 can also include an emergency data repository manager 612. The emergency data repository manager 612 can facilitate the encryption of user data into encrypted user data 611. The emergency data repository manager 612 can also facilitate the generation of encryption keys 616A-616N to encrypt data in a manner that may be decrypted by emergency service providers. In one embodiment a key derivation function 615 may be used to generate encryption keys 616A-616N based on keys provided via public certificates 619A-619N of the emergency service providers. The public certificates 619A-619N can include a certificate chain that facilitates the evaluation of the public certificates, all the way up to a CA root key that is stored in a trusted key store 626 of the mobile device 102. Encryption operations performed by the emergency data repository manager 612 can be assisted or accelerated by a cryptographic services library 628 that is stored in system memory 610. The cryptographic services library 628 can provide encryption primitives that are accelerated using cryptographic engines within the mobile device.

Figure 7:
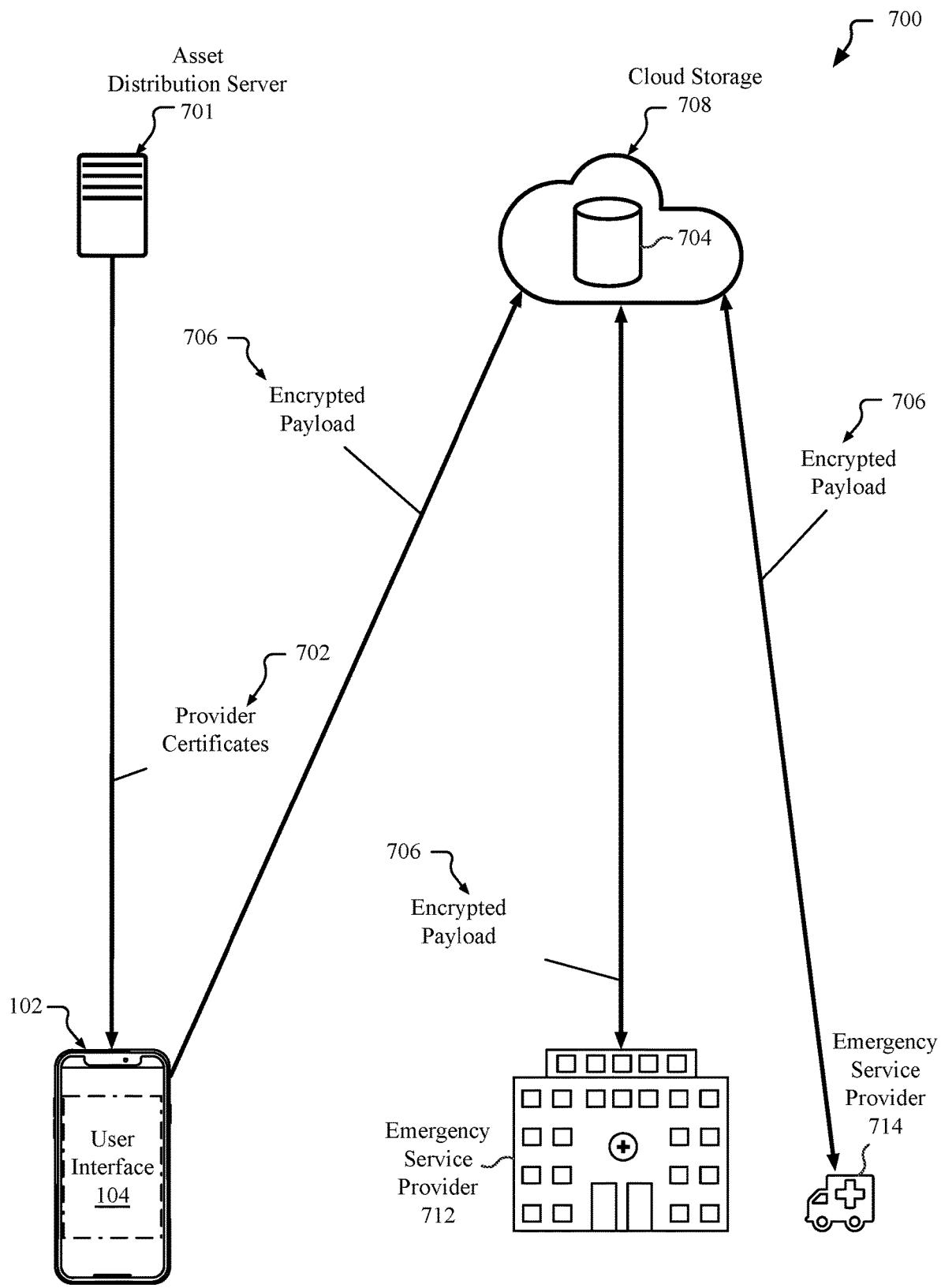
FIG. 7 illustrates a network system to enable the secure provision of location and altitude data to an emergency service provider.

FIG. 7 illustrates a network system 700 to enable the secure provision of location and altitude data to an emergency service provider. In one embodiment a mobile device vendor, or a service provider associated with the mobile device vender, provides an asset distribution server 701 that stores digital assets to be distributed to mobile devices. The asset distribution server 701 can provide an asset distribution mechanism that enables provider certificates 702 associated with an emergency service providers 712, 714 to be distributed to a mobile device 102. Each of the provider certificates 702 can be provided to the asset distribution server 701 by an emergency service provider 712, 714. The provider certificates 702 may also be provided to the asset distribution server 701 by another party on behalf of the emergency service provider 712, 714. Each emergency service provider 712, 714 provides a separate certificate or a common certificate may be used. The provider certificates 702 may be publicly trusted certificates that contain a certificate chain that allows evaluation of the validity of the certificate. The certificate chain can of each certificate can be evaluated through to a certificate authority root certificate that may be stored in a trust store on the mobile device 102. The provider certificates 702 can each specify a public key of a public/private key pair associated with an emergency service provider 712, 714.

The mobile device 102 can initiate contact with an emergency service provider 712, 714, for example, via the user interface 104 of the mobile device or via another technique to initiate an emergency call. Upon the mobile device 102 initiating contact (e.g., via a phone call) with an emergency service provider 712, 714, the mobile device can derive cryptographic material that includes an encryption key k and an initialization vector $IV_1$. The cryptographic material may be used to encrypt a payload to generate an encrypted payload 706. The encrypted payload 706 can include sensor data associated with user that is gathered by the mobile device 102 and/or accessories coupled with the mobile device 102. The encrypted payload 706 can include, for example, health data gathered by the mobile device 102 or a wearable electronic device associated with the mobile device 102. The encrypted payload 706 can also include a current geographic location determined for the mobile device 102, including an altitude associated with the geographic location. The encrypted payload 706 can be stored to a data repository 704 within a cloud storage server 708. In other implementations, instead of sending the current geographic location as determined by the mobile device 102 in the encrypted payload 706, identifying information for a location information server (LIS) may be transmitted, which enables the emergency service provider 712 to access a location or a location stream for the mobile device 102 that is facilitated by, for example, the device location service 138 as in FIG. 1A.

Emergency service providers 712, 714 can download the encrypted payload 706 from the data repository 704. The Emergency service providers 712, 714 can then decrypt the payload using an encryption key k and an initialization vector $IV_1$ derived via the private key of the public/private key pair associated with an emergency service provider 712, 714. Where the user is calling from a multi-floor building, the altitude component of the location data that is sent to the emergency service providers 712, 714 via the encrypted payload 706 can facilitate locating the caller within the building.

Figure 8:
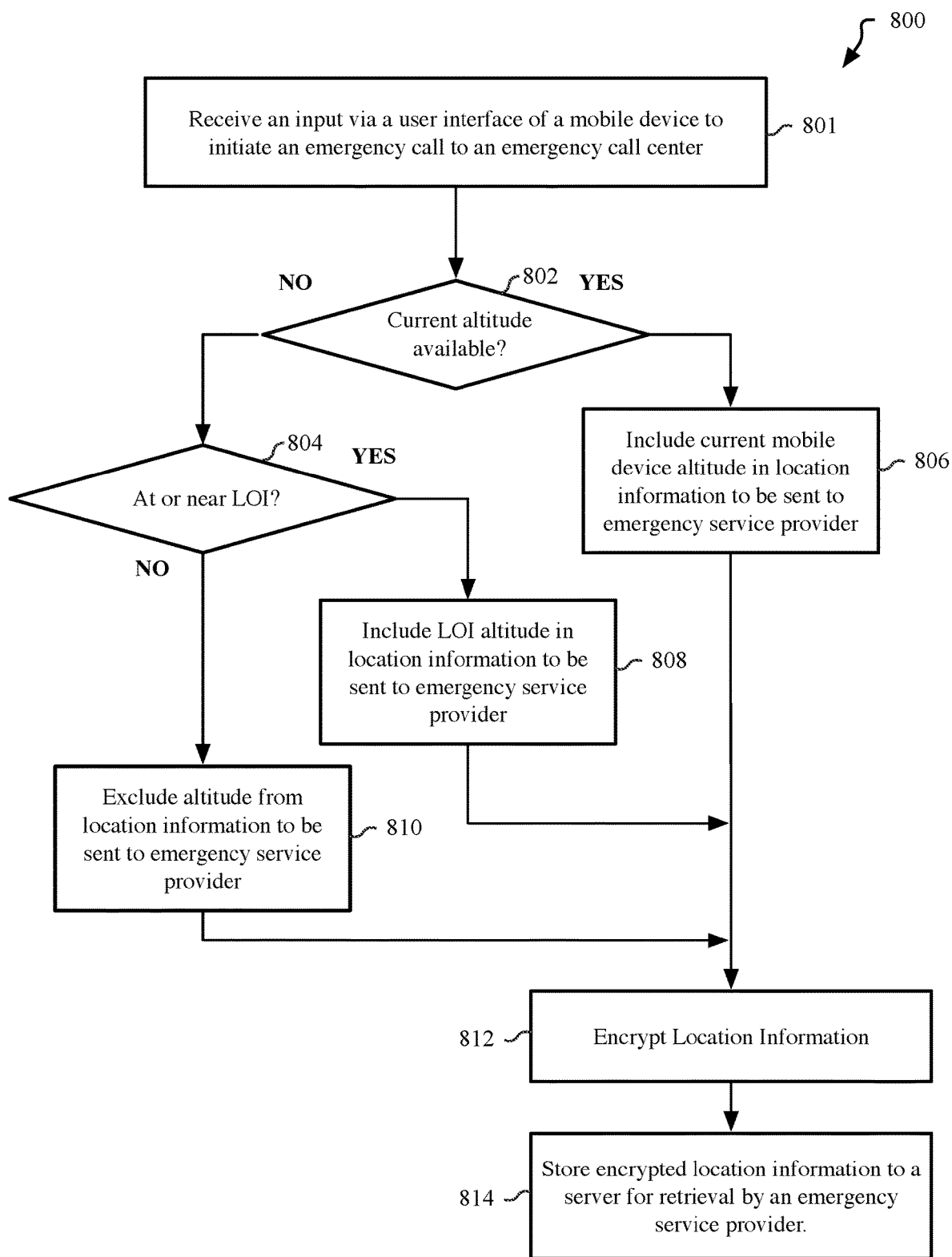
FIG. 8 illustrates a method to enable the secure provision of location and altitude data to an emergency service provider.

FIG. 8 illustrates a method 800 to enable the secure provision of location and altitude data to an emergency service provider. Method 800 includes, on a mobile device, performing an operation to receive an input via a user interface of a mobile device to initiate an emergency call to an emergency call center (801). The mobile device can determine if a current altitude is available for the device (802). If a current altitude is available (YES, 802), the mobile device can include the current altitude in the location information to be sent to the emergency service provider (806). If the current altitude is not available (NO, 802), method 800 includes performing, on the mobile device, an operation to determine if the mobile device is currently at or near a location of interest (804), or any location with a determined altitude. The mobile device can determine that an altitude is not currently available for the mobile device if the uncertainty of a current altitude estimate is above a threshold. If the mobile device is at or near a location of interest (YES, 804), the mobile device can include a previously determined altitude of the location of interest in the location information to be sent to the emergency service provider (808). If the mobile device is not at or near a location of interest (NO, 804), the mobile device can exclude an altitude from the location information to be sent to the emergency service provider (810). The location information, of course, can include a current determined location for the mobile device. The mobile device can then encrypt the location information, which may include an altitude if available (812). The mobile device can then store the encrypted location information to a server for retrieval by an emergency service provider (814).

As an alternative process, an identifier to a device location service may be provided to the emergency service provider to enable location data for the mobile device to be streamed to the emergency service provider. The altitude information that is provided may be an absolute altitude or a relative altitude that is relative to a ground level altitude. The altitude information may also include a translation from an altitude to a floor estimate for the building in which the user is located.

Figure 9:
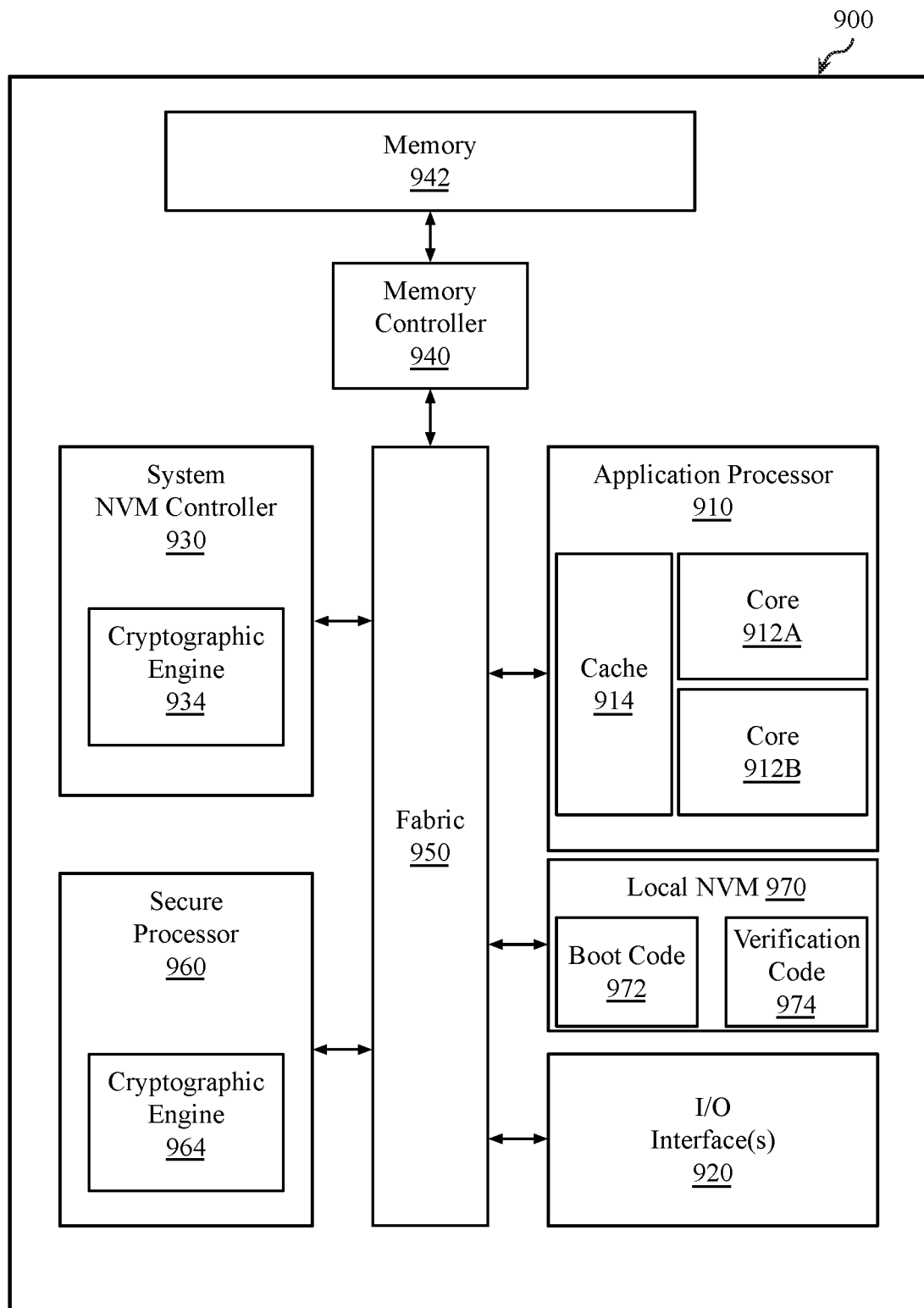
FIG. 9 illustrates an exemplary processing system suitable for the generation of cryptographic material.

FIG. 9 illustrates an exemplary processing system suitable for the generation of cryptographic material. In one embodiment the processing system 900 includes an application processor 910 and an interconnect fabric 950 that enables communication within the processing system 900, although a system bus may also be used in other embodiments. In one embodiment the application processor 910 includes multiple cores 912A-912B and at least one cache 914. The application processor 910 can facilitate execution of various applications on an electronic device, such as a smartphone, table, wearable device, or other electronic devices described herein. The application processor 910 can then securely boot using boot code 972 stored on local non-volatile memory 970, which can be a separate storage device than the primary non-volatile memory of the system, or can be a secure portion of the primary non-volatile memory. The boot code can be accompanied by verification code 974 that can be used verify that the boot code 972 has not been modified.

The processing system 900 also includes a secure processor 960, which can be any secure processor described herein, such as but not limited to a secure enclave processor (SEP), a secure element, or a trusted platform module (TPM). The secure processor 960 includes a secure circuit configured to maintain user keys for encrypting and decrypting data keys associated with a user. As used herein, the term "secure circuit" refers to a circuit that protects an isolated, internal resource from being directly accessed by any external circuits. The secure processor 960 can be used to secure communication with the peripherals connected via the peripheral hardware interface(s) 920. The secure processor 960 can include a cryptographic engine 964 that includes circuitry to perform cryptographic operations for the secure processor 960. The cryptographic operations can include the encryption and decryption of data keys that are used to perform storage volume encryption or other data encryption operations within a system.

The processing system 900 can also include a system non-volatile memory controller 930 that manages primary non-volatile memory of the system. The system non-volatile memory controller can also include a cryptographic engine 934 to enable the real-time encryption and decryption of data stored to the system non-volatile memory. The cryptographic engines 934, 964 may each implement any suitable encryption algorithm such as the Data Encryption Standard (DES), Advanced Encryption Standard (AES), Rivest Shamir Adleman (RSA), or Elliptic Curve Cryptography (ECC) based encryption algorithms.

Each of the application processor 910, secure processor 960 and system non-volatile memory controller 930 described herein may make use of a shared memory 942 that is accessible via a memory controller 940 coupled with the interconnect fabric 950.

Figure 10:
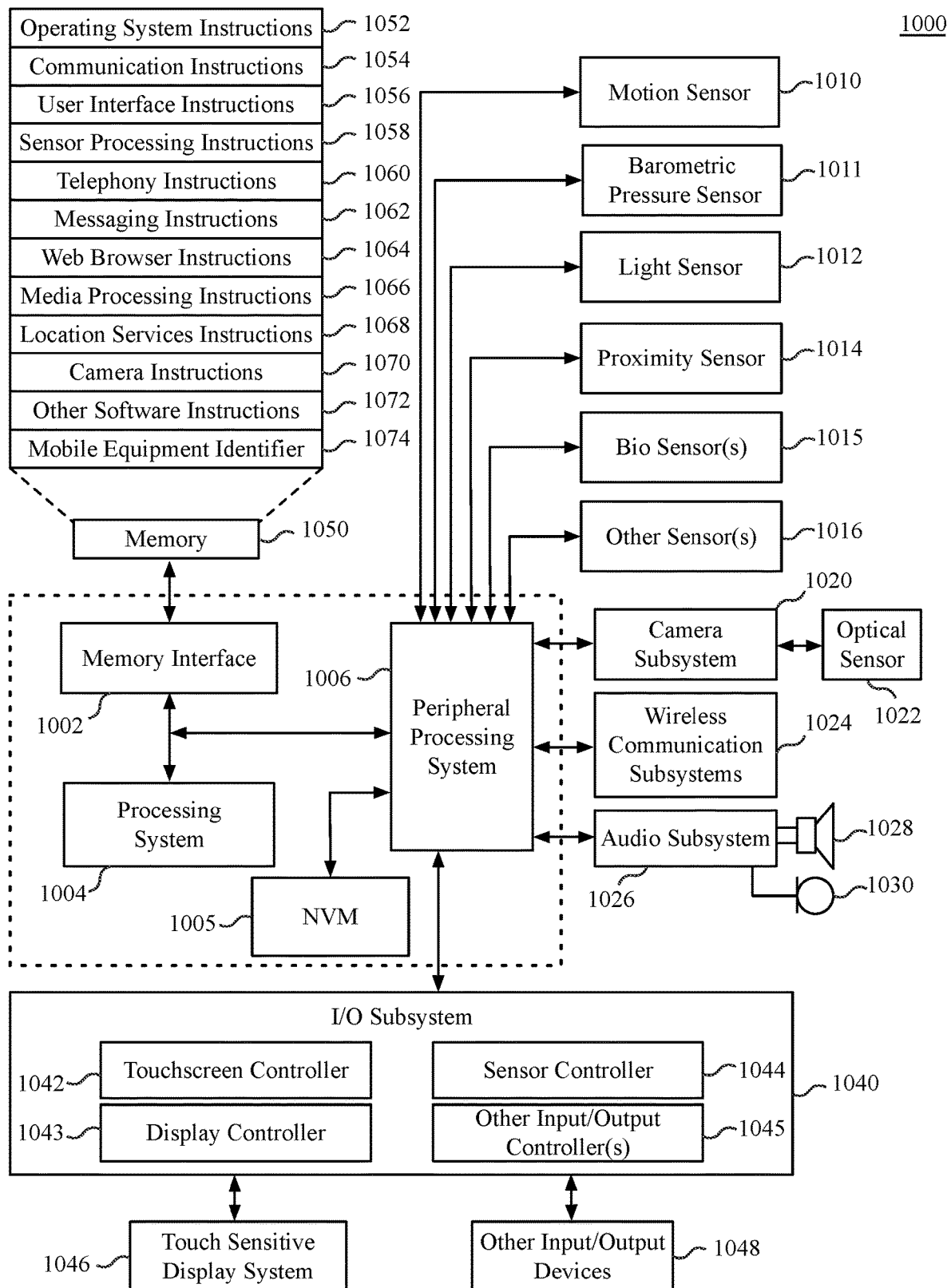
FIG. 10 is a block diagram of a computing device architecture, according to an embodiment.

FIG. 10 is a block diagram of a computing device architecture 1000, according to an embodiment. The computing device architecture 1000 includes a memory interface 1002, a processing system 1004, and a peripheral processing system 1006. The various components can be coupled by one or more communication buses, fabrics, or signal lines. The various components can be separate logical components or devices or can be integrated in one or more integrated circuits, such as in a system on a chip integrated circuit. The processing system 1004 may include multiple processors and/or co-processors. The various processors within the processing system 1004 can be similar in architecture or the processing system 1004 can be a heterogeneous processing system. In one embodiment the processing system 1004 is a heterogeneous processing system including one or more data processors, image processors and/or graphics processing units.

The memory interface 1002 can be coupled to memory 1050, which can include high-speed random-access memory such as static random-access memory (SRAM) or dynamic random-access memory (DRAM). The non-volatile memory 1005 can store runtime information, data, and/or instructions in non-volatile memory devices such as flash memory (e.g., NAND flash, NOR flash, etc.). The connection between the processing system 1004 and memory interface 1002 to the non-volatile memory 1005 can be facilitated via the peripheral processing system 1006.

Sensors, devices, and subsystems can be coupled to the peripheral processing system 1006 to facilitate multiple functionalities. For example, a motion sensor 1010, a barometric pressure sensor 1011, a light sensor 1012, and a proximity sensor 1014 can be coupled to the peripheral processing system 1006 to facilitate the mobile device functionality. Other sensors 1016 can also be connected to the peripheral processing system 1006, such as a positioning system (e.g., GPS receiver), a temperature sensor, a biometric sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

The peripheral processing system 1006 can enable a connection to communication peripherals including one or more wireless communication subsystems 1024, which can include radio frequency receivers and transmitters and/or optical (e.g., infrared) receivers and transmitters. The specific design and implementation of the wireless communication subsystems 1024 can depend on the communication network(s) over which a mobile device is intended to operate. For example, a mobile device including the illustrated computing device architecture 1000 can include wireless communication subsystems 1024 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The wireless communication subsystems 1024 can provide a communications mechanism over which a client browser application can retrieve resources from a remote web server. The peripheral processing system 1006 can also enable an interconnect to an audio subsystem 1026, which can be coupled to a speaker 1028 and a microphone 1030 to facilitate voice-enabled functions, such as voice recognition, voice replication, digital recording, and telephony functions.

The peripheral processing system 1006 can enable a connection to an I/O subsystem 1040 that includes a touchscreen controller 1042 and/or other input controller(s) 1045. The touchscreen controller 1042 can be coupled to a touch sensitive display system 1046 (e.g., touchscreen). The touch sensitive display system 1046 and touchscreen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment the display controller 1043 can provide frame data to the touch sensitive display system 1046 at a variable frame rate.

In one embodiment a sensor controller 1044 is included to monitor, control, and/or processes data received from one or more of the motion sensor 1010, light sensor 1012, proximity sensor 1014, or other sensors 1016. The sensor controller 1044 can include logic to interpret sensor data to determine the occurrence of one of more motion events or activities by analysis of the sensor data from the sensors.

In one embodiment the peripheral processing system 1006 can also enable a connection to one or more bio sensor(s) 1015. A bio sensor can be configured to detect biometric data for a user of computing device. Biometric data may be data that at least quasi-uniquely identifies the user among other humans based on the user's physical or behavioral characteristics. For example, in some embodiments the bio sensor(s) 1015 can include a finger print sensor that captures fingerprint data from the user. In another embodiment, bio sensor(s) 1015 include a camera that captures facial information from a user's face. In some embodiments the bio sensor(s) 1015 can maintain previously captured biometric data of an authorized user and compare the captured biometric data against newly received biometric data to authenticate a user.

In one embodiment the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel or micro kernel-based operating system.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or navigation instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identity (IMEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

As described herein, where GPS or other satellite-based positioning and/or navigation system is described, any global navigation satellite system (GNSS) or satellite-based positioning system may be used, such as but not limited to the Global Positioning System, Global Navigation Satellite System (GLONASS), BeiDou Navigation Satellite System (BDS), and the Galileo system. Where relevant, regional satellite systems may also be used.

Where Wi-Fi access points or wireless network access points are described herein, the access points may be any wireless access point that provides support for an IEEE 802.11 LAN protocol or an equivalent wireless network technology.

In the foregoing specification, details have been described with reference to specific embodiments. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one non-transitory machine-readable medium including instructions that, when performed by a machine cause the machine to perform acts of the method, or of an apparatus or system according to embodiments and examples described herein. Additionally various components described herein can be a means for performing the operations or functions described in accordance with an embodiment.

One embodiment provides an electronic device comprising a wireless network interface, one or more memory devices coupled with the wireless network interface, and one or more processors to execute instructions stored in the one or more memory devices, wherein the instructions cause the one or more processors to scan, via the wireless network interface, for wireless network access points within range of the electronic device, determine a received signal strength indicator for a set of wireless network access points detected during the scan, retrieve, from a server, a Z-axis coordinate for one or more wireless network access points in the set of wireless network access points, compute a set of weights for the one or more wireless access points based on a respective received signal strength indicator of the one or more wireless access points, compute a weighted average of the Z-axis coordinates based on the set of weights, and determine a Z-axis coordinate for the electronic device based on the weighted average.

In a further embodiment, the instructions cause the one or more processors to filter the set of wireless network access points to remove a network access point having an outlier Z-axis coordinate. To filter the set of wireless network access points to remove a network access point having an outlier Z-axis coordinate includes to determine that the wireless network access point has a Z-axis coordinate greater than a threshold value from the weighted average of the Z-axis coordinates and remove a network access point from the set of wireless network access points in response to the determination. The instructions cause the one or more processors to determine the Z-axis coordinate for the electronic device based on the weighted average of a filtered set of wireless access points. The Z-axis coordinate for the electronic device can be an absolute altitude, an elevation relative to a ground level altitude, or a floor ordinal of an indoor venue in which the electronic device is located.

In a further embodiment, to scan for wireless network access points within range of the electronic device includes to scan for wireless network access points over a first period of time, during the first period of time, store detected wireless network access points in a scan buffer in a memory of the one or more memory devices, monitor barometric pressure via barometric pressure sensor on the electronic device, in response to detection of a change in barometric pressure over a threshold during the first period of time, clear the scan buffer, and scan for wireless network access points over a second period of time.

In a further embodiment, the electronic device is communicatively coupled with a telephony service and during a call to an emergency service provider via the telephony service, transmit a location including the Z-axis coordinate to the emergency service provider. To transmit the location including the Z-axis coordinate to the emergency service provider includes to encrypt a data repository including the location and store the data repository to a server for retrieval by the emergency service provider.

One embodiment provides a method comprising, on an electronic device including a wireless network interface and one or more memory devices coupled with the wireless network interface, scanning, via a wireless network interface of the electronic device, for wireless network access points within range of the electronic device, determining a received signal strength indicator for a set of wireless network access points detected during the scan, retrieving, from a server, a Z-axis coordinate for one or more wireless network access points in the set of wireless network access points, computing a set of weights for the one or more wireless access points based on a respective received signal strength indicator of the one or more wireless access points, computing a weighted average of the Z-axis coordinates based on the set of weights, and determining a Z-axis coordinate for the electronic device based on the weighted average.

One embodiment provides a non-transitory machine-readable medium storing instructions to cause one or more processors of an electronic device to perform operations comprising, scanning, via a wireless network interface of the electronic device, for wireless network access points within range of the electronic device, determining a received signal strength indicator for a set of wireless network access points detected during the scan, retrieving, from a server, a Z-axis coordinate for one or more wireless network access points in the set of wireless network access points, computing a set of weights for the one or more wireless access points based on a respective received signal strength indicator of the one or more wireless access points, computing a weighted average of the Z-axis coordinates based on the set of weights, and determining a Z-axis coordinate for the electronic device based on the weighted average.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An electronic device comprising:
   a wireless network interface;
   one or more memory devices coupled with the wireless network interface; and
   one or more processors to execute instructions stored in the one or more memory devices, wherein the instructions cause the one or more processors to:
   scan, via the wireless network interface, for wireless network access points within range of the electronic device for a first period of time;
   monitor barometric pressure via a barometric pressure sensor on the electronic device during the first period of time;
   responsive to elapse of the first period of time, determine whether to restart the scan for wireless network access points based on whether a detected change in barometric pressure is over a threshold;
   determine a received signal strength indicator for a set of wireless network access points detected during the scan;
   retrieve, from a server, a Z-axis coordinate for one or more wireless network access points in the set of wireless network access points;
   compute a set of weights for the one or more wireless access points based on a respective received signal strength indicator of the one or more wireless access points;
   compute a weighted average of the Z-axis coordinates based on the set of weights; and
   determine a Z-axis coordinate for the electronic device based on the weighted average.

2. The electronic device as in claim 1, wherein the instructions cause the one or more processors to filter the set of wireless network access points to remove a network access point having an outlier Z-axis coordinate.

3. The electronic device as in claim 2, wherein to filter the set of wireless network access points to remove a network access point having an outlier Z-axis coordinate includes to:
   determine that the wireless network access point has a Z-axis coordinate greater than a threshold value from the weighted average of the Z-axis coordinates; and
   remove a network access point from the set of wireless network access points in response to the determination.

4. The electronic device as in claim 3, wherein the instructions cause the one or more processors to determine the Z-axis coordinate for the electronic device based on the weighted average of a filtered set of wireless access points.

5. The electronic device as in claim 1, wherein to scan for wireless network access points within range of the electronic device includes to:
   during the first period of time, store detected wireless network access points in a scan buffer in a memory of the one or more memory devices;
   in response to detection of a change in barometric pressure over the threshold during the first period of time, clear the scan buffer; and
   scan for wireless network access points over a second period of time.

6. The electronic device as in claim 1, wherein the Z-axis coordinate for the electronic device is an absolute altitude, an elevation relative to a ground level altitude, or a floor ordinal of an indoor venue in which the electronic device is located.

7. The electronic device as in claim 1, wherein the electronic device is communicatively coupled with a telephony service.

8. The electronic device as in claim 7, wherein the electronic device, during a call to an emergency service provider via the telephony service, is to transmit a location including the Z-axis coordinate to the emergency service provider.

9. The electronic device as in claim 8, wherein to transmit the location including the Z-axis coordinate to the emergency service provider includes to encrypt a data repository including the location and store the data repository to a server for retrieval by the emergency service provider.

10. A non-transitory machine-readable medium storing instructions to cause one or more processors of an electronic device to perform operations comprising:
    scanning, via a wireless network interface of the electronic device, for wireless network access points within range of the electronic device for a first period of time;
    monitoring barometric pressure via a barometric pressure sensor on the electronic device during the first period of time;
    responsive to elapse of the first period of time, determining whether to restart the scan for wireless network access points based on whether a detected change in barometric pressure is over a threshold;
    determining a received signal strength indicator for a set of wireless network access points detected during the scan;
    retrieving, from a server, a Z-axis coordinate for one or more wireless network access points in the set of wireless network access points;
    computing a set of weights for the one or more wireless access points based on a respective received signal strength indicator of the one or more wireless access points;
    computing a weighted average of the Z-axis coordinates based on the set of weights; and
    determining a Z-axis coordinate for the electronic device based on the weighted average.

11. The non-transitory machine-readable medium as in claim 10, the operations further comprising:
    filtering the set of wireless network access points to remove a network access point having an outlier Z-axis coordinate, wherein filtering the set of wireless network access points to remove a network access point having an outlier Z-axis coordinate includes operations comprising:
    determining that the wireless network access point has a Z-axis coordinate greater than a threshold value from the weighted average of the Z-axis coordinates; and
    removing a network access point from the set of wireless network access points in response to the determination.

12. The non-transitory machine-readable medium as in claim 11, the operations further comprising determining the Z-axis coordinate for the electronic device based on the weighted average of a filtered set of wireless access points.

13. The non-transitory machine-readable medium as in claim 10, wherein scanning for wireless network access points within range of the electronic device includes operations comprising:
    during the first period of time, storing detected wireless network access points in a scan buffer in a memory of the electronic device;
    in response to detecting a change in barometric pressure over the threshold during the first period of time, clearing the scan buffer; and
    scanning for wireless network access points over a second period of time.

14. The non-transitory machine-readable medium as in claim 10, wherein the Z-axis coordinate for the electronic device is an absolute altitude, an elevation relative to a ground level altitude, or a floor ordinal of an indoor venue in which the electronic device is located.

15. The non-transitory machine-readable medium as in claim 10, wherein the electronic device is communicatively coupled with a telephony service and the operations further comprise, during a call to an emergency service provider via the telephony service, transmitting a location including the Z-axis coordinate to the emergency service provider, wherein transmitting the location including the Z-axis coordinate to the emergency service provider includes encrypting a data repository including the location and store the data repository to a server for retrieval by the emergency service provider.

16. A method comprising:
    on an electronic device including a wireless network interface and one or more memory devices coupled with the wireless network interface:
    scanning, via a wireless network interface of the electronic device, for wireless network access points within range of the electronic device for a first period of time;
    monitoring barometric pressure via a barometric pressure sensor on the electronic device during the first period of time;
    responsive to elapse of the first period of time, determining whether to restart the scan for wireless network access points based on whether a detected change in barometric pressure is over a threshold;
    determining a received signal strength indicator for a set of wireless network access points detected during the scan;
    retrieving, from a server, a Z-axis coordinate for one or more wireless network access points in the set of wireless network access points;
    computing a set of weights for the one or more wireless access points based on a respective received signal strength indicator of the one or more wireless access points;
    computing a weighted average of the Z-axis coordinates based on the set of weights; and
    determining a Z-axis coordinate for the electronic device based on the weighted average.

17. The method as in claim 16, further comprising:
    filtering the set of wireless network access points to remove a network access point having an outlier Z-axis coordinate, wherein filtering the set of wireless network access points to remove a network access point having an outlier Z-axis coordinate includes operations comprising:
    determining that the wireless network access point has a Z-axis coordinate greater than a threshold value from the weighted average of the Z-axis coordinates;
    removing a network access point from the set of wireless network access points in response to the determination; and
    determining the Z-axis coordinate for the electronic device based on the weighted average of a filtered set of wireless access points.

18. The method as in claim 16, further comprising:
    during the first period of time, storing detected wireless network access points in a scan buffer in a memory of the one or more memory devices;

in response to detecting a change in barometric pressure over the threshold during the first period of time, clearing the scan buffer; and scanning for wireless network access points over a second period of time.

19. The method as in claim 16, wherein the Z-axis coordinate for the electronic device is an absolute altitude, an elevation relative to a ground level altitude, or a floor ordinal of an indoor venue in which the electronic device is located.

20. The method as in claim 16, wherein the electronic device is communicatively coupled with a telephony service and the method further comprises, during a call to an emergency service provider via the telephony service, transmitting a location including the Z-axis coordinate to the emergency service provider, wherein transmitting the location including the Z-axis coordinate to the emergency service provider includes encrypting a data repository including the location and store the data repository to a server for retrieval by the emergency service provider.

* * * * *